(12) United States Patent
Takeuchi

(10) Patent No.: US 12,379,093 B2
(45) Date of Patent: Aug. 5, 2025

(54) ILLUMINATION APPARATUS

(71) Applicant: KYOCERA Corporation, Kyoto (JP)

(72) Inventor: Eri Takeuchi, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 19 days.

(21) Appl. No.: 18/572,952

(22) PCT Filed: Jun. 20, 2022

(86) PCT No.: PCT/JP2022/024536
§ 371 (c)(1),
(2) Date: Dec. 21, 2023

(87) PCT Pub. No.: WO2023/276758
PCT Pub. Date: Jan. 5, 2023

(65) Prior Publication Data
US 2024/0240774 A1 Jul. 18, 2024

(30) Foreign Application Priority Data

Jun. 30, 2021 (JP) .................................. 2021-108718
Feb. 21, 2022 (WO) .................. PCT/JP2022/006911

(51) Int. Cl.
*F21V 13/12* (2006.01)
*F21V 5/04* (2006.01)
(Continued)

(52) U.S. Cl.
CPC ................ *F21V 13/12* (2013.01); *F21V 5/04* (2013.01); *F21V 9/08* (2013.01); *F21V 14/06* (2013.01); *F21Y 2115/30* (2016.08)

(58) Field of Classification Search
CPC ........ F21V 5/04–048; F21V 9/08; F21V 9/40; G02B 7/02–023; F21K 9/60–69; G03B 21/14–2086
See application file for complete search history.

(56) References Cited

U.S. PATENT DOCUMENTS 10,415,799 B1 * 9/2019 Grove ...................... F21V 11/00
10,782,518 B2 * 9/2020 Root .................... G02B 6/4231
(Continued)

FOREIGN PATENT DOCUMENTS

CA      2712666 A1 *  2/2011  ........... G02B 6/4201
EP      3540298 A      9/2019
(Continued)

*Primary Examiner* — Mariceli Santiago
(74) *Attorney, Agent, or Firm* — Volpe Koenig

(57) ABSTRACT

An illumination apparatus includes a housing, a first light source, and a first lens optical system. The housing includes an opening. The first light source includes a first emission portion to emit first light into an internal space of the housing. The first lens optical system includes at least one first lens between the first emission portion and the opening in the housing on a path of the first light. The first lens optical system forms an image of the first light from the first emission portion on an imaginary image plane adjacent to the opening and causes the first light to be emitted through the opening. An angle defining a numerical aperture of the first lens optical system is greater than a divergence angle of the first light from the first emission portion.

22 Claims, 17 Drawing Sheets

(51) Int. Cl.
*F21V 9/08* (2018.01)
*F21V 14/06* (2006.01)
*F21Y 115/30* (2016.01)

(56) References Cited

U.S. PATENT DOCUMENTS

| | | |
|---|---|---|
| 2010/0033959 A1 | 2/2010 | Alessio |
| 2017/0063032 A1* | 3/2017 | Morizumi ............ H01S 5/0087 |
| 2019/0072240 A1 | 3/2019 | Dodo et al. |

FOREIGN PATENT DOCUMENTS

| | | |
|---|---|---|
| HR | P20180085 A2 | 7/2019 |
| JP | 03-043903 A | 2/1991 |
| JP | 2009-021139 A | 1/2009 |
| JP | 2017-147025 A | 8/2017 |
| WO | 2007/105647 A1 | 9/2007 |
| WO | WO-2024084935 A1 * | 4/2024 |

* cited by examiner

S1

S1

S1

ILLUMINATION APPARATUS

CROSS-REFERENCE TO RELATED APPLICATION

This application claims priority to Japanese Patent Application No. 2021-108718 filed on Jun. 30, 2021 and International Application No. PCT/JP2022/006911 filed on Feb. 21, 2022, the entire disclosure of which is incorporated herein by reference.

FIELD

The present disclosure relates to an illumination apparatus.

BACKGROUND

A known illumination apparatus emits light with a light source and reflects the light with an ellipsoidal mirror to illuminate an illumination space (e.g., Patent Literatures 1 and 2).

CITATION LIST

Patent Literature

Patent Literature 1: Japanese Unexamined Patent Application Publication No. 3-43903
Patent Literature 2: Japanese Unexamined Patent Application Publication No. 2017-147025

SUMMARY

One or more aspects of the present disclosure are directed to an illumination apparatus.

An illumination apparatus includes a housing, a first light source, and a first lens optical system. The housing includes an opening. The first light source includes a first emission portion to emit first light into an internal space of the housing. The first lens optical system includes at least one first lens between the first emission portion and the opening in the housing on a path of the first light. The first lens optical system forms an image of the first light from the first emission portion on an imaginary image plane adjacent to the opening and causes the first light to be emitted through the opening. An angle defining a numerical aperture of the first lens optical system is greater than a divergence angle of the first light from the first emission portion.

DESCRIPTION OF EMBODIMENTS

First Embodiment

Figure 1:
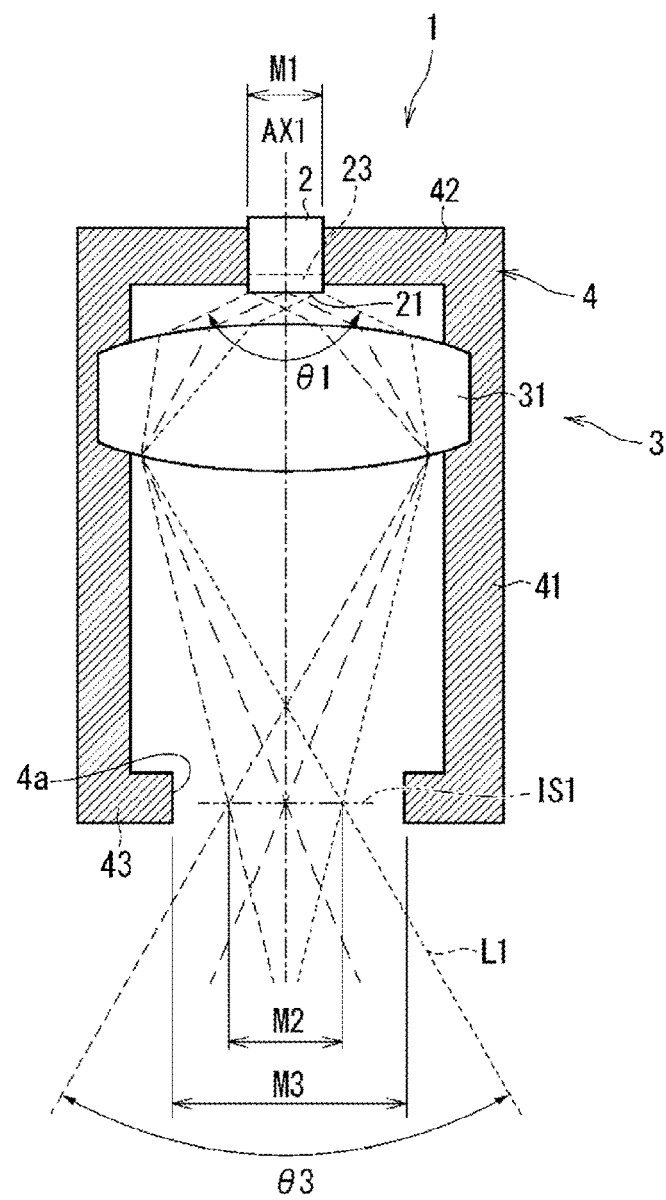
FIG. 1 is a schematic cross-sectional view of an illumination apparatus with an example structure according to a first embodiment.

FIG. 1 is a schematic cross-sectional view of an illumination apparatus 1 with an example structure according to a first embodiment. The illumination apparatus 1 emits first light L1 into an illumination space S1. The illumination apparatus 1 is located on, for example, the ceiling in the illumination space S1.

As illustrated in FIG. 1, the illumination apparatus 1 includes a first light source 2, a first lens optical system 3, and a housing 4.

The first light source 2 includes a first emission portion (e.g., an emission surface) 21 for emitting the first light L1 into the internal space of the housing 4. The first light L1 is, for example, visible light. The first light source 2 may include, for example, a semiconductor laser element such as a laser diode (LD), or a light emitter such as a vertical-cavity surface-emitting laser (VCSEL) or a superluminescent diode (SLD). The first emission portion 21 of the first light source 2 may be an output end of the light emitter.

In some embodiments, the first light source 2 may include a light guide such as a fiber or a rod lens, in addition to the light emitter. The fiber includes a linear core and a cladding. The cladding covering the core has a lower refractive index than the core. The first light L1 can pass through the core while being totally internally reflected from the interface between the core and the cladding. The rod lens is, for example, columnar. The first light L1 can pass through the rod lens while being totally internally reflected from the side surface of the rod lens.

The light guide has an input end corresponding to a first end face of the fiber or of the rod lens in the longitudinal direction. The light guide has an output end corresponding to a second end face of the fiber or of the rod lens opposite to the first end face.

The first light L1 from the light emitter enters the light guide through the input end, travels through the light guide, and is emitted from the light guide through the output end into the internal space of the housing 4. In this case, the first emission portion 21 of the first light source 2 corresponds to the output end of the light guide.

The first emission portion 21 may include a wavelength converter 23. The first light L1 may be fluorescence emitted from the wavelength converter 23. The wavelength converter 23 may contain, for example, $BaMgAl_{10}O_{17}$:Eu, (Sr, Ca, Ba)$_{10}$(PO$_4$)$_6$Cl$_2$:Eu, or (Sr, Ba)$_{10}$(PO$_4$)$_6$Cl$_2$:Eu as a wavelength conversion material that converts excitation light to blue light. The wavelength converter 23 may contain, for example, (Sr, Ba, Ca)$_5$(PO$_4$)$_3$Cl:Eu or Sr$_4$Al$_{14}$O$_{25}$:Eu as a wavelength conversion material that converts excitation light to blue green light. The wavelength converter 23 may contain, for example, SrSi$_2$(O, Cl)$_2$N$_2$:Eu, (Sr, Ba, Mg)$_2$SiO$_4$:Eu$^{2+}$, ZnS:Cu, Al, or Zn$_2$SiO$_4$:Mn as a wavelength conversion material that converts excitation light to green light. The wavelength converter 23 may contain, for example, Y$_2$O$_2$S:Eu, Y$_2$O$_3$:Eu, SrCaClAlSiN$_3$:Eu$^{2+}$, CaAlSiN$_3$:Eu, or CaAlSi(ON)$_3$:Eu as a wavelength conversion material that converts excitation light to red light. The wavelength converter 23 may contain 3Ga$_5$O$_{12}$:Cr as a wavelength conversion material that converts excitation light to light with a wavelength in the near-infrared region.

In this case, the first light source 2 emits excitation light. The excitation light may be, for example, violet light with a peak near 405 nm or blue light with a peak near 450 nm. The illumination apparatus 1 has higher color rendering when the excitation light has a peak between 380 and 415 nm with the wavelength converter 23 including RGB phosphors.

As illustrated in FIG. 1, the first light L1 from the first emission portion 21 of the first light source 2 diverges while traveling. In other words, the first light L1 has a size larger at a larger distance from the first light source 2 in a cross section perpendicular to an optical axis AX1 of the first light source 2. In the example in FIG. 1, the dashed lines schematically indicate beams of the first light L1 emitted from points on the first emission portion 21. The first light L1 may have a size defined by a contour indicating a light intensity of $1/e^2$ of the peak value in the light intensity distribution of the first light L1 in a cross section perpendicular to the optical axis AX1. The number e is referred to as an Euler's number. In other words, the first light L1 in FIG. 1 includes two outermost beams having a light intensity of $1/e^2$ of the peak value in the light intensity distribution in a cross section perpendicular to the optical axis AX1. The light outside the area surrounded by the above contour (two outermost beams) may be noise light.

The first lens optical system 3 is located on the path of the first light L1 from the first light source 2 in the internal space of the housing 4. The first lens optical system 3 includes a first lens 31 to focus the first light L1 from the first light source 2 onto an imaginary image plane IS1 located opposite to the first emission portion 21, or in other words, adjacent to an opening 4a. In other words, the first lens optical system 3 is an optical imaging system that forms a real image of the first light source 2 on the image plane IS1. The first emission portion 21 is in a conjugate relationship with the image plane IS1. The conjugate relationship herein is not limited to its precise meaning. The image plane IS1 may be a portion on which first light L1 is focused most intensely at a position nearer the opening 4a than the first emission portion 21 (a portion on which the first light L1 has the smallest cross section perpendicular to the optical axis AX1 of the first light source 2).

As illustrated in FIG. 1, the first lens optical system 3 may simply include a single first lens 31. The first lens 31 may be a spherical biconvex lens. The first lens 31 is made of, for example, a glass material such as optical glass, a resin material such as an acrylic resin, or both.

In the example in FIG. 1, the first light source 2 includes the first emission portion 21 fixed to the housing 4 and emits the first light L1 toward the first lens optical system 3. The first light L1 passes through the first lens optical system 3 and then through the emission opening 4a in the housing 4 into the illumination space S1 outside the housing 4. The emission opening 4a connects the internal space of the housing 4 with the illumination space S1 outside the housing 4.

In the example in FIG. 1, the housing 4 includes a side wall 41, a first member 42, and a second member 43. The side wall 41 is tubular (e.g., cylindrical). In the example in FIG. 1, the tubular side wall 41 has the central axis substantially aligned with the optical axis AX1 of the first light source 2. The first member 42 is located at a first peripheral edge of the side wall 41. The first member 42 is, for example, a plate with its periphery connected to the first peripheral edge of the side wall 41. The second member 43 is located at a second peripheral edge of the side wall 41 opposite to the first peripheral edge. The second member 43 is, for example, a plate with its periphery connected to the second peripheral edge of the side wall 41. The internal space of the housing 4 is defined by the side wall 41, the first member 42, and the second member 43.

In the example in FIG. 1, the first member 42 includes, in its center, a through-hole extending through the first member 42 along the central axis. The through-hole receives the first light source 2. In the example in FIG. 1, the second member 43 includes, in its center, the emission opening 4a extending through the second member 43 along the central axis. In the example in FIG. 1, the second member 43 extends from the lower end of the side wall 41 toward the optical axis AX1 to the periphery of the emission opening 4a. In other words, the emission opening 4a has a diameter smaller than the inner diameter of the side wall 41. The housing 4 with the second member 43 can thus include a smaller emission opening 4a, through which the first lens optical system 3 is less visible from outside the housing 4. This achieves a comfortable illumination space with less glare.

The first lens optical system 3 is between the first emission portion 21 of the first light source 2 and the emission opening 4a in the housing 4. The first lens optical system 3 focuses the first light L1 from the first light source 2 onto the image plane IS1. In the example in FIG. 1, the image plane IS1 is located in the emission opening 4a. In other words, the position of the first light source 2, the position of the first lens optical system 3, and the optical conditions of the first lens optical system 3 are determined to cause the image plane IS1 to be in the emission opening 4a. The first light L1 is thus focused with the highest intensity in the opening 4a, allowing the opening 4a to be smaller in the housing 4 with the second member 43. The first lens optical system 3 is thus less visible from outside the housing 4. This achieves a comfortable illumination space with less glare.

The image plane IS1 may not be located in the emission opening 4a. The image plane IS1 may be slightly shifted from the emission opening 4a in the traveling direction of the first light L1 passing through the emission opening 4a. More specifically, the image plane IS1 may be slightly shifted toward the inside of the housing 4 from the emission opening 4a or slightly shifted toward the illumination space S1 from the emission opening 4a.

In the illumination apparatus 1, the first lens optical system 3 has an imaging magnification less than or equal to a ratio (=M3/M1) of a size M3 of the emission opening 4a to a size M1 of the first light L1 on the first emission portion 21 of the first light source 2. The size M1 of the first light L1 on the first emission portion 21 corresponds to the emission diameter of the first emission portion 21, or in other words, the size of the first emission portion 21. For example, the size M1 corresponds to the area of the end face of a fiber core or of a rod lens. When the first emission portion 21 is the end face of a light emitter, the size M1 of the first light L1 on the first emission portion 21 corresponds to the size of the end face of the light emitter. When the first emission portion 21 is a surface of the wavelength converter 23, the size M1 of the first light L1 on the first emission portion 21 corresponds to the size of the surface of the wavelength converter 23.

When the first light source 2 is an LD, for example, the emission diameter can be smaller than when the first light source 2 is a light-emitting diode (LED) or a VCSEL. The first light L1 can thus have a smaller size M2 on the image plane IS1. This achieves a comfortable illumination space with less glare.

For the first light L1 with a circular cross section, the size M1 may be the diameter of the first light L1. For the first light L1 with a rectangular cross section, the size M1 may be the diagonal length of the first light L1. The size M1 of the first light L1 on the first emission portion 21 is, for example, about 2 to 3 mm.

The size M3 of the emission opening 4a corresponds to the area of the emission opening 4a in a cross section perpendicular to the optical axis AX1 in the emission opening 4a. For the emission opening 4a being circular or rectangular as viewed along the optical axis AX1, the emission opening 4a has a diameter or a diagonal length of, for example, about several to several tens of millimeters. The emission opening 4a may have a diameter of, for example, about 5 to 15 mm. For the emission opening 4a defined by an inclined surface, the size M3 of the emission opening 4a varies depending on the position along the optical axis AX1. In this case, the size M3 of the emission opening 4a may be, for example, the minimum value of the varying sizes.

The imaging magnification refers to the ratio of the size M2 of the first light L1 on the image plane IS1 to the size M1 of the first light L1 on the first emission portion 21 of the first light source 2.

With the imaging magnification being less than or equal to the above ratio, the size M2 of the first light L1 on the image plane IS1 is less than or equal to the size M3 of the emission opening 4a. In this structure, the first light L1 is less likely to be incident on the second member 43, and is thus less likely to be reflected or scattered from the inner surface of the tubular side wall 41 or from the second member 43. This reduces unintended reflection-scattering light leaking through the emission opening 4a.

The first lens optical system 3 may have an imaging magnification to cause the first light L1 passing through the emission opening 4a to have a smaller size than the emission opening 4a. This can further reduce reflection-scattering light.

The illumination apparatus 1 will now be described in more detail by referring to a divergence angle $\theta 1$ of the first light L1 on the first emission portion 21 of the first light source 2. The divergence angle $\theta 1$ is, for example, the angle formed by the two outermost beams of the first light L1 on the first emission portion 21 in a cross section including the optical axis AX1 (e.g., in the page of FIG. 1). The first light L1 emitted from any point on the first emission portion 21 may have the same divergence angle. The divergence angle $\theta 1$ is thus the angle formed by the two outermost beams of the first light L1 of all the beams from the points on the first emission portion 21 of the first light source 2. The two outermost beams of the first light L1 may define, for example, the emission diameter of the first light L1. The two outermost beams of the first light L1 may define the size of the first light L1 in a cross section perpendicular to the optical axis AX1 of the first light source 2.

Figure 2:
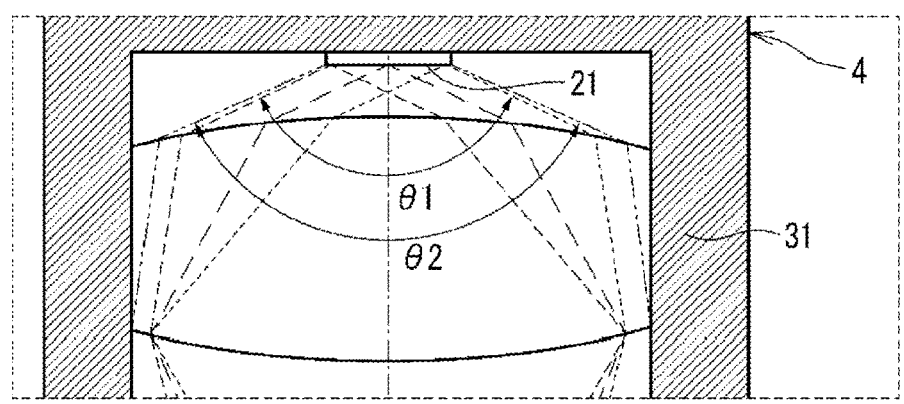
FIG. 2 is a diagram describing an angle defining the numerical aperture of a first lens optical system.

In the illumination apparatus 1, the divergence angle $\theta 1$ of the first light source 2 is less than or equal to an angle $\theta 2$ defining the numerical aperture of the first lens optical system 3. The numerical aperture is the product of the sine of half the angle $\theta 2$ and the refractive index. FIG. 2 is a diagram describing the angle $\theta 2$ defining the numerical aperture of the first lens optical system 3. The angle $\theta 2$ herein refers to, for example, the angle formed by the two outermost beams of imaginary light traveling from the first emission portion 21 through an active area of the first lens optical system 3. The active area herein refers to an area through which light passes to achieve the optical performance of the first lens optical system 3. For example, the active area of the first lens 31 is the area of the main surface of the first lens 31 excluding a predetermined peripheral width. More specifically, the active area of the first lens 31 may be, for example, an area surrounded by an inner peripheral portion (a lens holder) of the housing 4 holding the periphery of the first lens 31.

With the divergence angle $\theta 1$ being less than or equal to the angle $\theta 2$, the first light L1 can pass within the active area of the first lens optical system 3. The first light L1 is thus substantially not incident on the edge of the first lens 31, thus reducing or avoiding unintended reflection or scattering of the first light L1 from the edge.

As described above, in the illumination apparatus 1, the first lens optical system 3 has an imaging magnification less than or equal to the above ratio, and the divergence angle $\theta 1$ is less than or equal to the angle $\theta 2$. This reduces or avoids unintended reflection or scattering of the first light L1 from the periphery of the first lens optical system 3 and the periphery of the emission opening 4a. The illumination apparatus 1 can thus emit a major portion of the first light L1 from the first light source 2 into the illumination space S1 through the emission opening 4a. In other words, the first light L1 can be emitted into the illumination space S1 at a higher intensity. The structure can also reduce reflection-scattering light leaking into the illumination space S1, thus reducing unevenness (e.g., glare) of the first light L1 emitted into the illumination space S1. The illumination apparatus 1 can thus emit the first light L1 with high efficiency and high quality into the illumination space S1.

The first light L1 may be emitted through the emission opening 4a without being incident on the housing 4. The first light L1 without being incident on the housing 4 herein is not limited to its precise meaning. For example, noise light (e.g., scattered light) may be incident on the housing 4 when the two outermost beams of the first light L1 travel through the space from the first emission portion 21 to the emission opening 4a without being incident on the housing 4.

Figure 3:
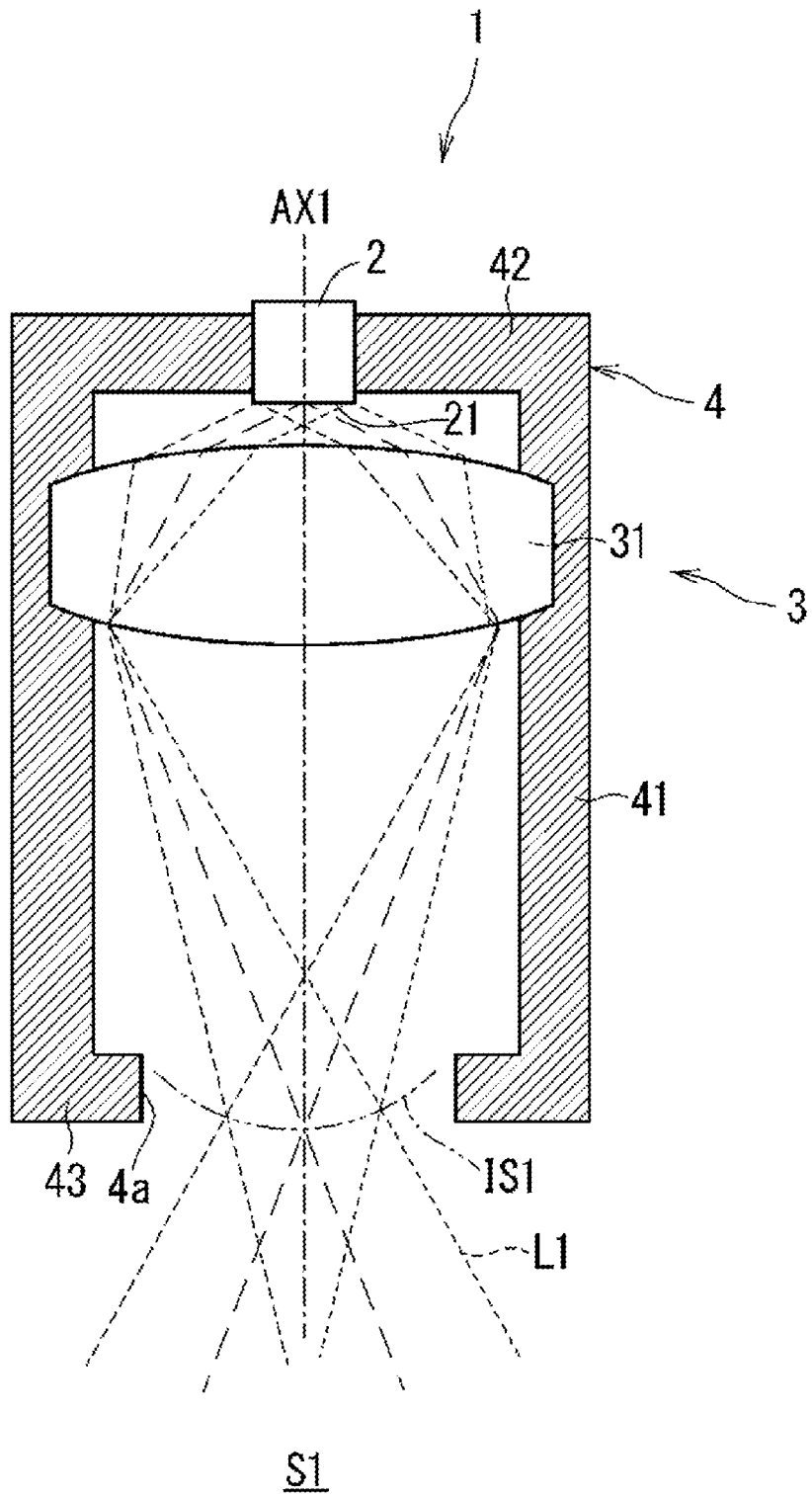
FIG. 3 is a schematic cross-sectional view of an illumination apparatus in a first implementation of the first embodiment.

FIG. 3 is a schematic cross-sectional view of the illumination apparatus 1 in a first implementation. In the example in FIG. 3, the image plane IS1 is curved. More specifically, for example, the image plane IS1 is curved and protrudes toward the illumination space S1. The first lens optical system 3 with this structure may include an inexpensive first lens 31. The illumination apparatus 1 can thus be manufactured at a lower cost. The first lens 31 may include a continuously curved surface. For example, the main surface of the first lens 31 through which the first light L1 passes may be a step-free curved surface. In other words, the first lens 31 may not be a Fresnel lens. The first lens 31 is thus less likely to scatter or reflect light, thus achieving a comfortable illumination space with less glare.

Figure 4:
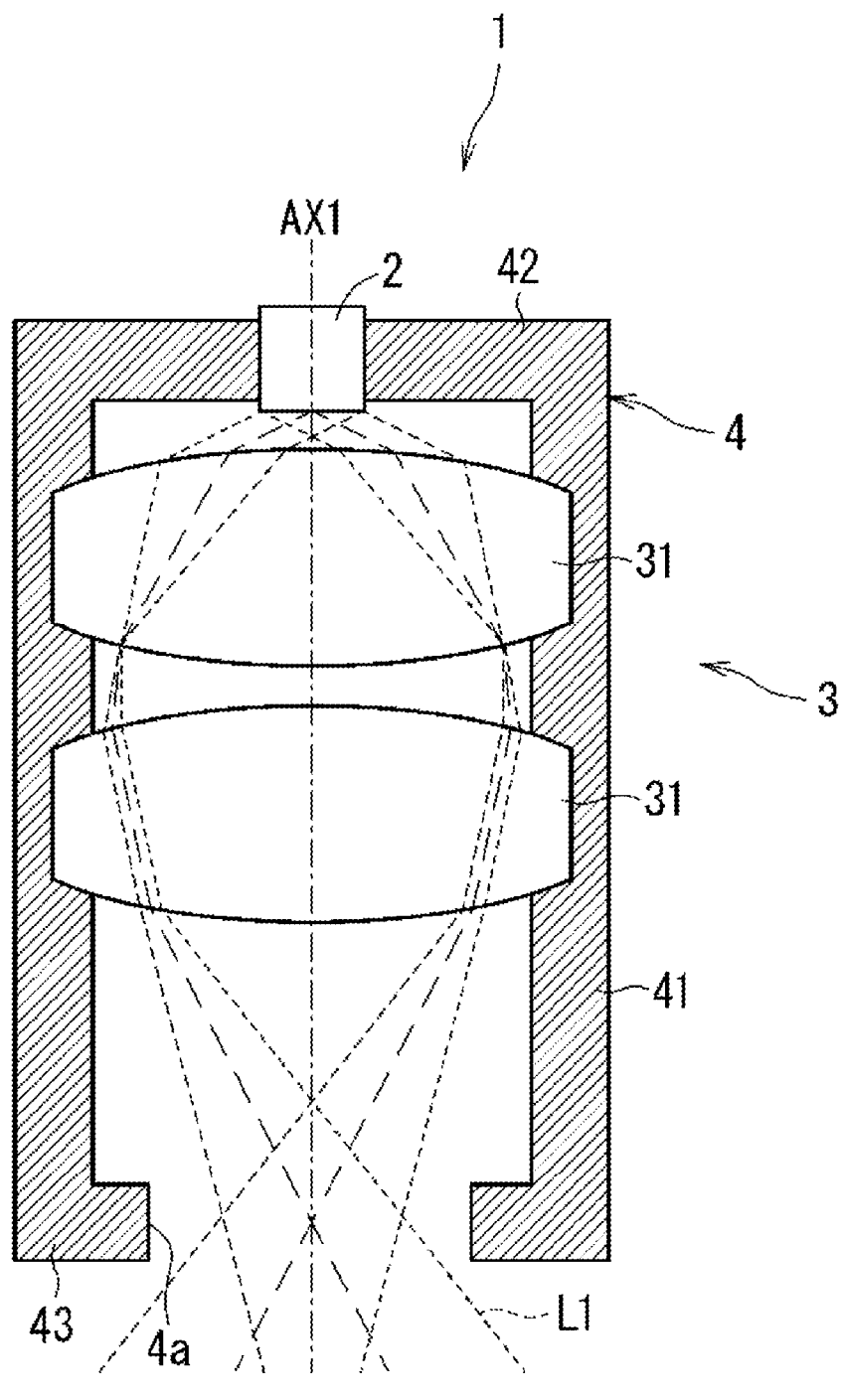
FIG. 4 is a schematic cross-sectional view of an illumination apparatus in a second implementation of the first embodiment.
Figure 5:
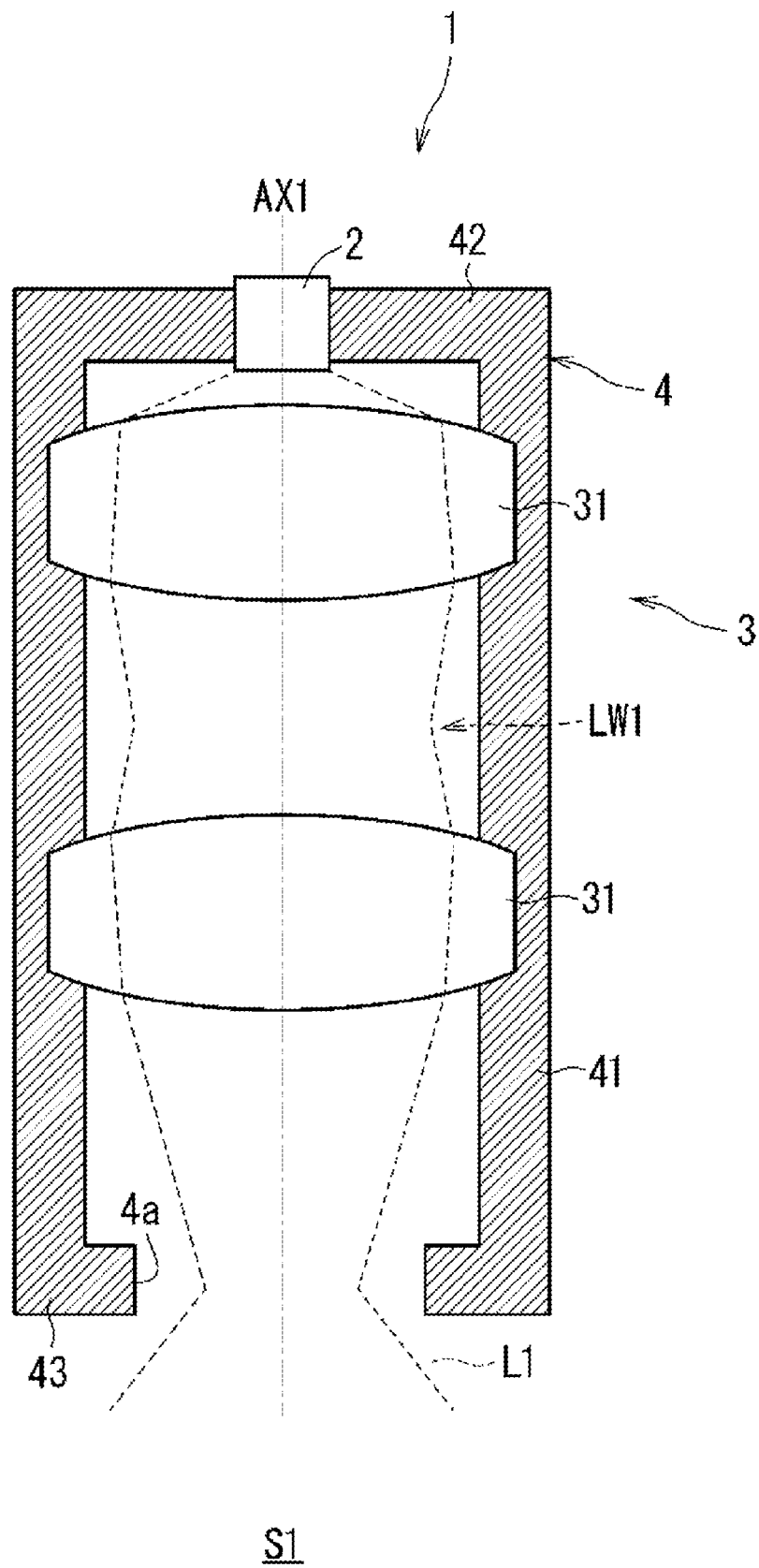
FIG. 5 is a schematic cross-sectional view of an illumination apparatus in a third implementation of the first embodiment.

FIG. 4 is a schematic cross-sectional view of the illumination apparatus 1 in a second implementation. In the example in FIG. 4, the first lens optical system 3 includes multiple first lenses 31 aligned on the path of the first light L1. The first lenses 31 may be aligned in the optical axis direction of the first light L1. Such first lenses 31 may also be referred to as compound lenses. The first lens optical system 3 including the combined first lenses 31 can easily have intended optical characteristics without including a special optical element, such as a Fresnel lens. FIG. 5 is a schematic cross-sectional view of the illumination apparatus 1 in a third implementation. The structure in the third implementation is the same as or similar to the structure in the second implementation. As illustrated in the third implementation, the first light L1 may include, between the first lenses 31, a portion (a waist LW1) with a diameter smaller than the diameter of the first light L1 passing through each first lens 31. More specifically, the minimum value of the diameter (the diameter of the waist LW1) of the first light L1 between the two adjacent first lenses 31 may be less than the minimum value of the diameter of the first light L1 in each of the two first lenses 31. In the second implementation and the third implementation, for example, the first lens optical system 3 can have a higher imaging magnification easily. The first lens optical system 3 may include, for example, three or more lenses aligned in the optical axis direction of the first light L1. The first lens optical system 3 can thus easily have intended optical characteristics.

Although the first lenses 31 are spherical lenses in the examples in FIGS. 1 to 5, the first lenses 31 may be aspherical lenses or free-form lenses.

Referring to FIG. 1, a divergence angle θ3 of the first light L1 in the illumination space S1 is less than the divergence angle θ1 of the first light L1 entering the first lens optical system 3. In other words, the first lens optical system 3 is designed to have the divergence angle θ3 less than the divergence angle θ1. The divergence angle θ1 may be the divergence angle of the first light L1 immediately before entering the first lens optical system 3. The divergence angle θ3 may be the divergence angle of the first light L1 immediately after passing the image plane IS1. More specifically, for example, the illumination apparatus 1 may have the divergence angle θ3 to emit the first light L1 through the emission opening 4a at an orientation angle (e.g., a half-power angle) of less than 60 degrees. This reduces visible glare caused by, for example, multiple illumination apparatuses 1 installed at regular intervals in the illumination space S1, thus achieving a more comfortable illumination space S1. The illumination apparatus 1 may have an orientation angle of, for example, less than 45, 30, or 15 degrees.

In the examples in FIGS. 1 and 3 to 5, the distance between the first emission portion 21 and the emission opening 4a is larger than the inner diameter of the housing 4. The distance between the first emission portion 21 and the emission opening 4a herein is, for example, the distance on the path along the optical axis AX1. With the distance being larger, the first lens optical system 3 and the emission opening 4a can have a larger spacing in between. Thus, the first lens optical system 3 can include multiple first lenses 31 with a larger spacing between the first lens 31 nearest the emission opening 4a and the emission opening 4a. The first lens optical system 3 is thus less visible from outside the housing 4, achieving a comfortable illumination space S1 with less glare. The distance between the first lens optical system 3 and the emission opening 4a may be larger than the inner diameter of the housing 4.

Second Embodiment

In the present embodiment, the angle θ2 defining the numerical aperture of the first lens optical system 3 is greater than or equal to the divergence angle θ1 of the first light L1 on the first emission portion 21. This structure reduces unintended reflection or scattering of the first light L1 inside the housing 4, but can cause reflection or scattering of a minor portion of the first light L1 from the surface of each first lens 31. Such unintended reflection-scattering light can cause slight unevenness of light when emitted into the illumination space S1 through the emission opening 4a.

In the second embodiment, such unevenness of the first light L1 emitted into the illumination space S1 may be further reduced. The first light L1 reflected or scattered inside the housing 4 is hereafter also referred to as reflection-scattering light L11. The reflection-scattering light L11 may be a part of the first light L1 deviating from the path of the first light L1 that forms an image on the image plane IS1, and may be either reflected light or scattered light.

Figure 6:
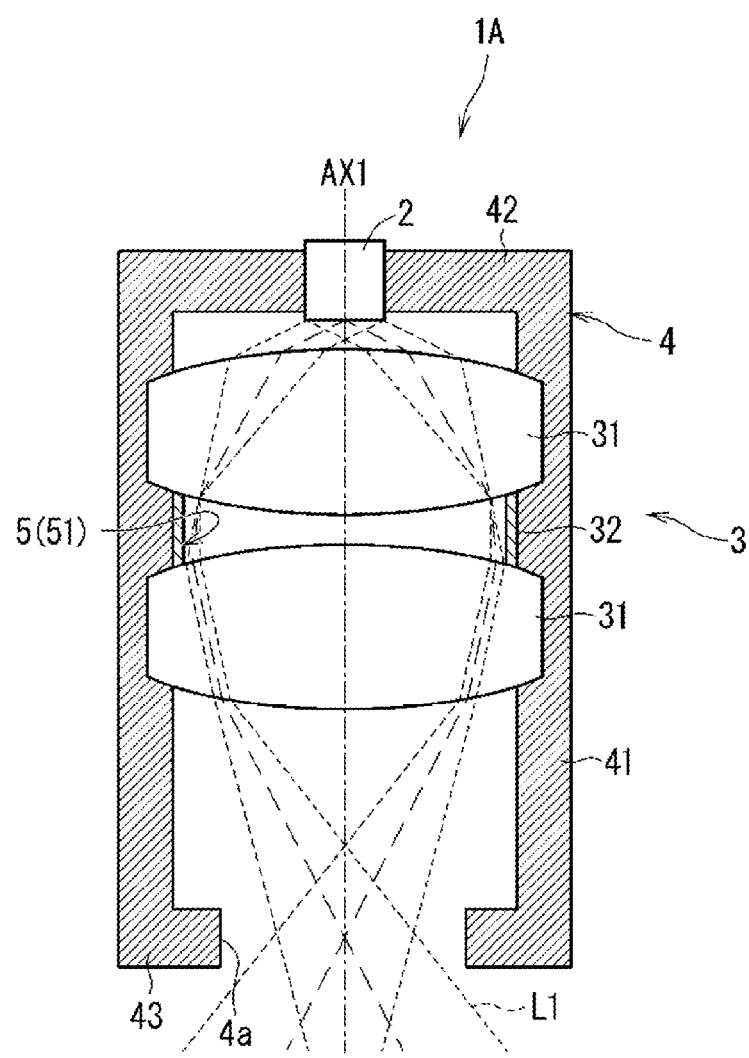
FIG. 6 is a schematic cross-sectional view of an illumination apparatus with an example structure according to a second embodiment.

FIG. 6 is a schematic cross-sectional view of an illumination apparatus 1A with an example structure according to the second embodiment. The illumination apparatus 1A differs from the illumination apparatus 1 in that the illumination apparatus 1A includes a light reducer 5. The light reducer 5 is inside the housing 4. The light reducer 5 is located to reduce the reflection-scattering light L11 to be emitted through the emission opening 4a.

The first lens optical system 3 in the illumination apparatus 1A includes multiple first lenses 31 and one or more spacers 32. In the example in FIG. 6, the first lens optical system 3 includes two first lenses 31 and one spacer 32. The spacer 32 defines the spacing between the two first lenses 31. The spacer 32 is between the two adjacent first lenses 31 and is in contact with the two first lenses 31. Thus, the spacing between the two first lenses 31 is equal to the thickness of the spacer 32 (the thickness along the optical axis AX1). The spacer 32 is, for example, annular and surrounds the optical axis AX1.

In the example in FIG. 6, the light reducer 5 is located on the inner wall of the spacer 32 and exposed in the internal space of the housing 4. The light reducer 5 includes, for example, a reflection reducer 51. The reflection reducer 51 may include an absorbing film with a high absorptivity of the first light L1. The absorptivity may be higher than or equal to, for example, 60, 80, or 90%. The reflection reducer 51 may have a high absorptivity for the entire wavelength range or for the peak wavelength of the first light L1. The reflection reducer 51 has a higher absorptivity of the first light L1 than the spacer 32.

The reflection reducer 51 is formed by, for example, blackening the inner wall of the spacer 32. More specifically, for example, the reflection reducer 51 is formed on the inner wall of the spacer 32 by blackening including conversion coating, plating, and painting. The blackening may produce a matte surface or a glossy surface. In this case, the reflection reducer 51 is made of a black material, such as a black metal, a black metal oxide film, a black resin, or any combination of these.

In some embodiments, the reflection reducer 51 may include a dielectric multilayer film. The dielectric multilayer film includes, for example, multiple dielectric thin films stacked on one another. The dielectric is made of, for example, one or more of titanium dioxide ($TiO_2$), $SiO_2$, niobium pentoxide ($Nb_2O_5$), tantalum pentoxide ($Ta_2O_5$), or magnesium fluoride ($MgF_2$). The dielectric multilayer film may also be referred to as a low-reflection film or an anti-reflection film.

The reflection reducer 51 may be formed directly on the inner wall of the spacer 32, or may be formed on a predetermined film substrate that is then fixed to the inner wall of the spacer 32. The substrate may be bonded to the inner wall of the spacer 32 with, for example, an adhesive.

In some embodiments, the reflection reducer 51 may include a flocked sheet. The flocked sheet may include, for example, a substrate such as paper or cloth with chemical fibers upright on the substrate. A black flocked sheet can further reduce reflection of the reflection-scattering light L11 than a flocked sheet in another color.

In the illumination apparatus 1A, for example, the reflection-scattering light L11 can be incident on the reflection reducer 51 after being reflected or scattered from the first lens optical system 3 toward the inner wall of the spacer 32. The reflection reducer 51, which reduces reflection of the reflection-scattering light L11, further reduces the reflection-scattering light L11 to be emitted through the emission opening 4a. The illumination apparatus 1A can thus emit the first light L1 with higher quality into the illumination space S1.

Figure 7:
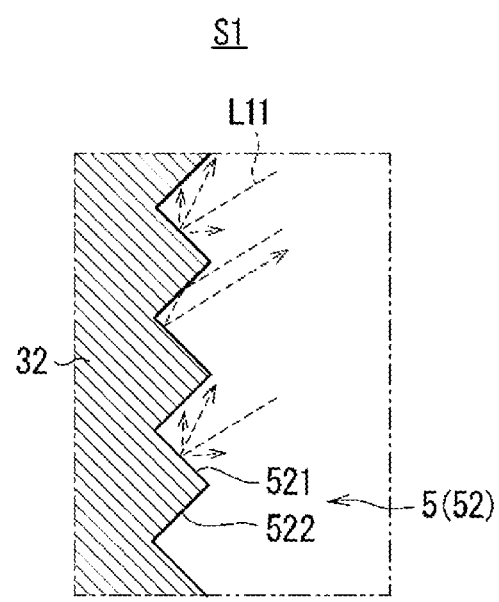
FIG. 7 is a schematic cross-sectional view of a light reducer with an example structure.

FIG. 7 is a partially enlarged schematic view of the light reducer 5 in another example. The light reducer 5 includes a recess-protrusion portion 52. The recess-protrusion portion 52 has a shape corresponding to, for example, the shape of the inner wall surface of the spacer 32. FIG. 7 schematically illustrates a part of the recess-protrusion portion 52. The recess-protrusion portion 52 includes recesses and protrusions arranged in the optical axis direction parallel to the optical axis AX1. In other words, the recess-protrusion portion 52 includes recesses and protrusions alternating in a cross section including the optical axis AX1.

In the example in FIG. 7, the recess-protrusion portion 52 is in the shape of a saw blade. The saw blade includes teeth (protrusions) each including a first surface 521 nearer the first light source 2 and a second surface 522 nearer the emission opening 4a. In the example in FIG. 7, each first surface 521 is inclined toward the optical axis AX1 at a smaller distance from the emission opening 4a in the optical axis direction. Each second surface 522 is inclined away from the optical axis AX1 at a smaller distance from the emission opening 4a in the optical axis direction. The recess-protrusion portion 52 includes the first surfaces 521 and the second surfaces 522 that are alternate and continuous with each other. As illustrated in FIG. 7, each first surface 521 and each second surface 522 may have substantially the same length. In other words, the first surface 521 and the second surface 522 may correspond to the equal sides of an isosceles triangle in a cross section (e.g., in the page of FIG. 7) including the optical axis AX1. The recess-protrusion portion 52 may have a helical shape similarly to an internal thread or may have a shape with multiple rings arranged in the optical axis direction. The recess-protrusion portion 52 includes recesses and protrusions at a pitch of, for example, less than or equal to about several millimeters.

The reflection-scattering light L11 is incident on the inner wall of the spacer 32 mainly obliquely from the first light source 2. Thus, more reflection-scattering light L11 is incident on the first surface 521 than on the second surface 522 in the inner wall of the spacer 32. The first surface 521 reflects or scatters the incident reflection-scattering light L11 mainly obliquely away from the emission opening 4a. The reflection-scattering light L11 is thus reflected or scattered a larger number of times and can attenuate effectively in the housing 4. The reflection-scattering light L11 is thus less likely to be emitted through the emission opening 4a.

When the reflection-scattering light L11 from the first light source 2 is incident on the second surface 522, the second surface 522 reflects or scatters the reflection-scattering light L11 mainly to the first surface 521, which then reflects or scatters the reflection-scattering light L11 obliquely toward the first light source 2. The reflection-scattering light L11 is thus less likely to be emitted through the emission opening 4a.

As described above, the light reducer 5 including the recess-protrusion portion 52 also reduces the reflection-scattering light L11 to be emitted through the emission opening 4a. In other words, the illumination apparatus 1A can emit the first light L1 with higher quality into the illumination space S1.

Figure 8:
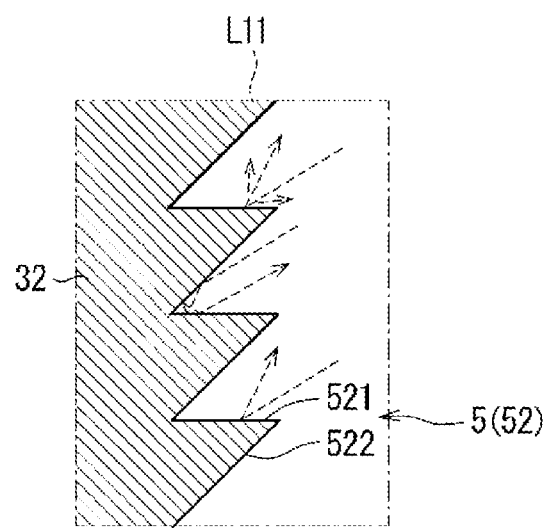
FIG. 8 is a schematic cross-sectional view of a light reducer with another example structure.

Although each first surface 521 and each second surface 522 have substantially the same length in the example in FIG. 7, the surfaces may have different lengths. FIG. 8 is a schematic diagram of the recess-protrusion portion 52 with another example structure. In the example in FIG. 8 as well, the recess-protrusion portion 52 has a shape corresponding to the shape of the inner wall surface of the spacer 32. In the example in FIG. 8, each second surface 522 is inclined away from the optical axis AX1 at a smaller distance from the emission opening 4a and has a greater length than each first surface 521. In the example in FIG. 8, each first surface 521 is substantially perpendicular to the optical axis AX1. In a cross section including the optical axis AX1, the first surface 521 corresponds to a leg of a right triangle, and the second surface 522 corresponds to the hypotenuse of the right triangle.

The reflection-scattering light L11 is incident on the inner wall surface of the spacer 32 as well mainly obliquely from the first light source 2. The first surface 521 reflects or scatters the incident reflection-scattering light L11 mainly away from the emission opening 4a. More specifically, the first surface 521 reflects or scatters the reflection-scattering light L11 mainly obliquely toward the first light source 2. Although a portion of the reflection-scattering light L11 from the first surface 521 can be incident on the second surface 522, the first surface 521 can reflect or scatter a major portion of the reflection-scattering light L11 obliquely toward the first light source 2, with the second surface 522 being inclined.

When the reflection-scattering light L11 from the first light source 2 is incident on the second surface 522, the second surface 522 reflects or scatters the reflection-scattering light L11 to the first surface 521, which then reflects or scatters the reflection-scattering light L11 obliquely toward the first light source 2.

As described above, the reflection-scattering light L11 incident on the recess-protrusion portion 52 from the first light source 2 is mainly reflected or scattered obliquely toward the first light source 2. The reflection-scattering light L11 is thus less likely to be emitted through the emission opening 4a.

Figure 9:
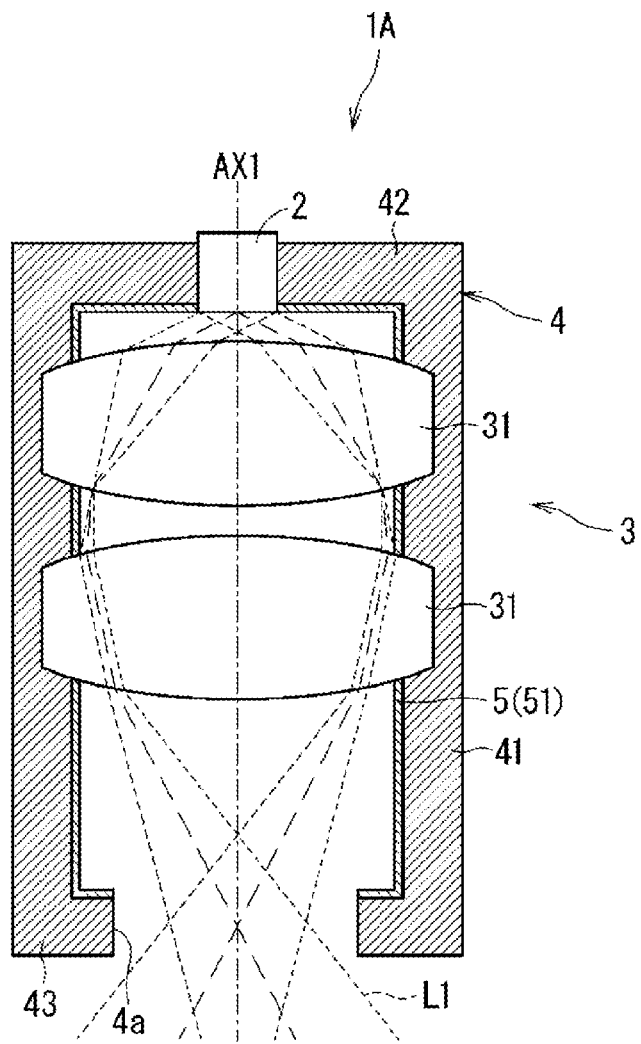
FIG. 9 is a schematic cross-sectional view of an illumination apparatus in a first implementation of the second embodiment.

Although the light reducer 5 is located on the inner wall of the spacer 32 in the above example, the light reducer 5 may be at any other position. FIG. 9 is a schematic cross-sectional view of the illumination apparatus 1A in a first implementation. In the example in FIG. 9, the light reducer 5 is located on the inner wall of the housing 4. The light reducer 5 may include the reflection reducer 51. The reflection reducer 51, which reduces reflection of the incident reflection-scattering light L11, reduces the reflection-scattering light L11 to be emitted into the illumination space S1 through the emission opening 4a.

The reflection reducer 51 may be located entirely on the inner wall of the housing 4 as illustrated in FIG. 9 or may be located partially on the inner wall of the housing 4. For example, the reflection reducer 51 may be located entirely or partially on the inner surface of the side wall 41 surrounding the optical axis AX1. For example, the reflection reducer 51 may be located along the entire inner peripheral surface of the side wall 41.

Figure 10:
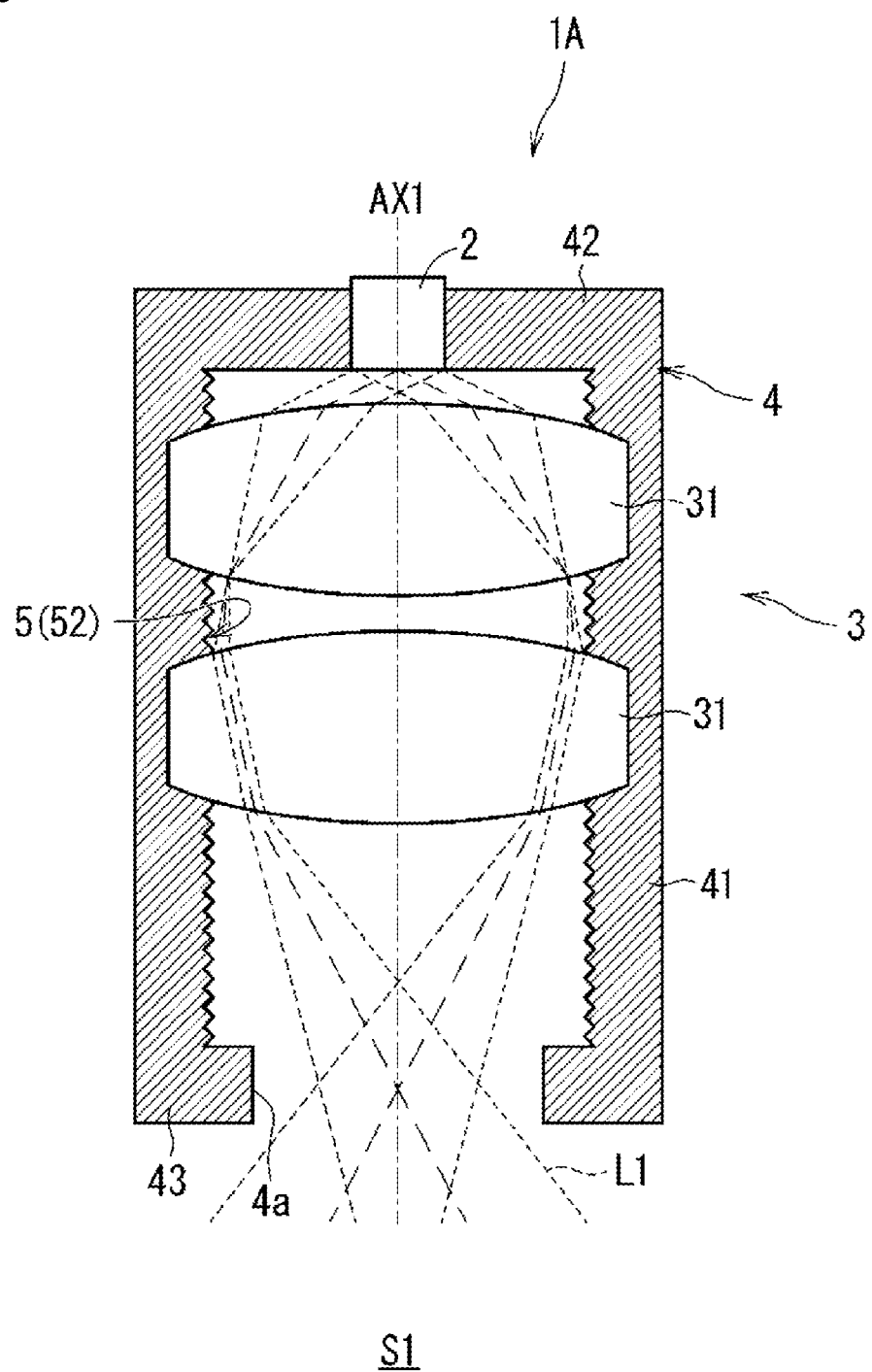
FIG. 10 is a schematic cross-sectional view of an illumination apparatus in a second implementation of the second embodiment.

FIG. 10 is a schematic cross-sectional view of the illumination apparatus 1A in a second implementation. As illustrated in FIG. 10, the light reducer 5 on the inner wall of the housing 4 may include the recess-protrusion portion 52. In other words, the inner wall of the housing 4 may include the recess-protrusion portion 52 as the light reducer 5. In this case, the recess-protrusion portion 52 may be located entirely or partially on the inner wall surface of the housing 4. The recess-protrusion portion 52 may be located entirely or partially at least on the inner surface of the side wall 41. For example, the recess-protrusion portion 52 is located along the entire inner peripheral surface of the side wall 41.

The reflection-scattering light L11 incident obliquely from the first light source 2 on the recess-protrusion portion 52 on the side wall 41 is mainly reflected or scattered obliquely toward the first light source 2. This reduces the reflection-scattering light L11 to be emitted into the illumination space S1 through the emission opening 4a.

As described above, the light reducer 5 including the reflection reducer 51 or the recess-protrusion portion 52 may be located at least partially on the inner wall of the housing 4. More specifically, the light reducer 5 may be located on the inner surface of the side wall 41 between the first emission portion 21 of the first light source 2 and the first lens 31 or between the first lens 31 and the emission opening 4a. In a structure including multiple first lenses 31, the light reducer 5 may be located on the inner surface of the side wall 41 between the first lenses 31.

The light reducer 5 may be located between the first lens 31 and the first emission portion 21 without being located between the first lens 31 and the emission opening 4a. The illumination apparatus with this structure reduces glare inside the housing and can also be inconspicuous when, for example, its portion around the emission opening 4a has the same color, white, as the installation location (e.g., the ceiling). This structure can further enhance the user comfort.

In the above example, the light reducer 5 is located on the inner wall of the spacer 32, the inner wall of the housing 4, or both. However, the structure is not limited to this example. The light reducer 5 may be at any position to be exposed in the internal space of the housing 4 without interfering with the first light L1 passing through the first lens optical system 3 to form an image on the image plane IS1. For example, the light reducer 5 may be located on the surface of a lens holder (not illustrated) holding the first lens 31.

The light reducer 5 may include both the reflection reducer 51 and the recess-protrusion portion 52. In this case, the reflection reducer 51 is located on the surface of the recess-protrusion portion 52.

Third Embodiment

Figure 11:
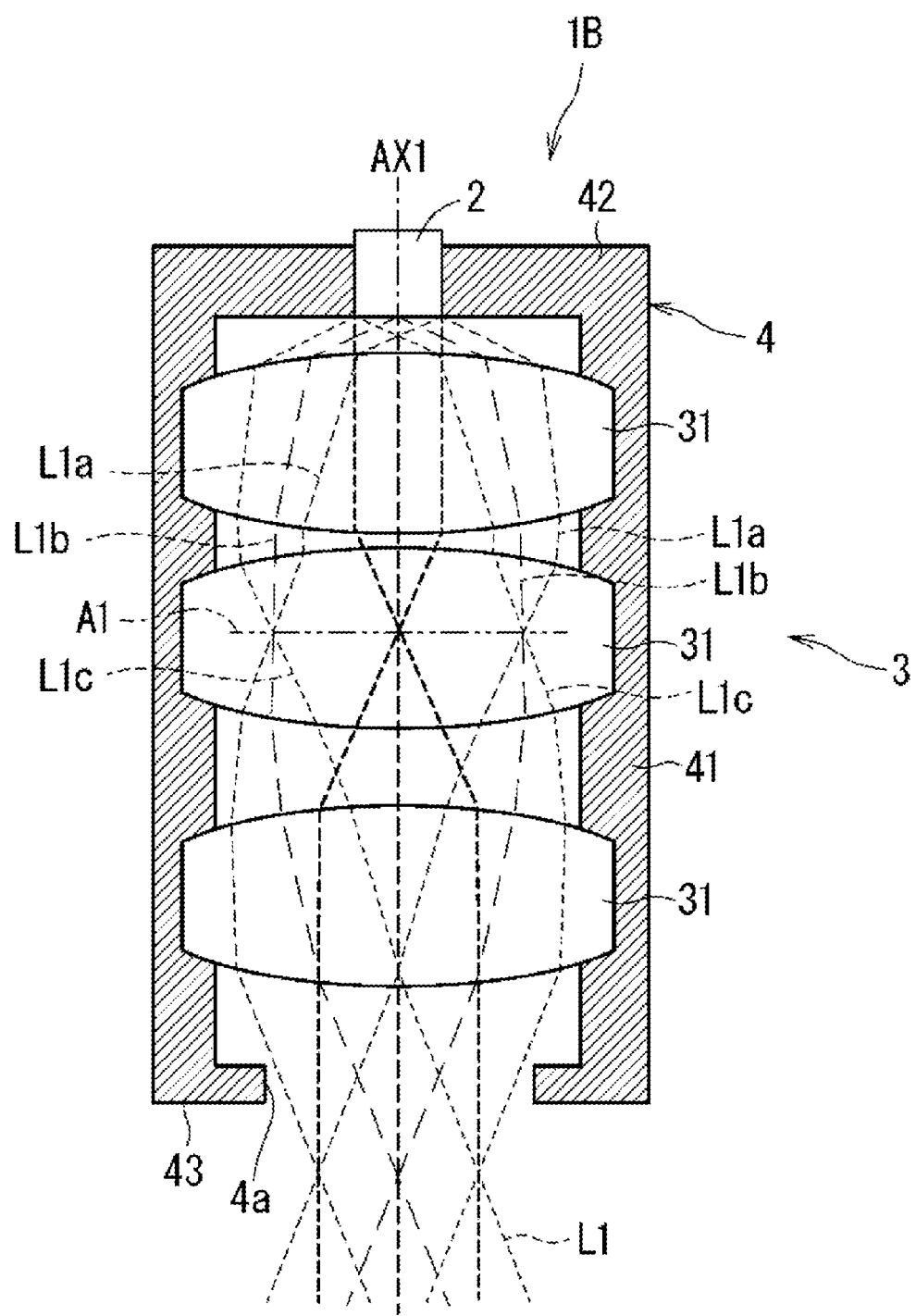
FIG. 11 is a schematic cross-sectional view of an illumination apparatus with an example structure according to a third embodiment.

FIG. 11 is a schematic cross-sectional view of an illumination apparatus 1B with an example structure according to a third embodiment. The illumination apparatus 1B differs from the illumination apparatus 1 in the specific structure of the first lens optical system 3. In the illumination apparatus 1i, the first lens optical system 3 includes a double telecentric optical system with multiple first lenses 31. In the double telecentric optical system, the main beams of the first light L1 are parallel to the optical axis AX1 adjacent to the first light source 2 and adjacent to the emission opening 4a. In the example in FIG. 11, the thick dashed lines indicate the main beams of the first light L1 emitted from points on the first emission portion 21.

The main beams are in the center of the first light L1 on a plane A1 perpendicular to the optical axis AX1 at an aperture position. The aperture position refers to, for example, the position of the plane A1 with the highest proportion of overlap between portions of the first light L1 emitted from the points on the first emission portion 21 when the plane A1 is moved in the optical axis direction. In this example, the first light L1 includes three portions referred to as a first light portion L1a, a first light portion L1b, and a first light portion L1c emitted from three points on the first emission portion 21. As illustrated in FIG. 11, the first light portion L1a, the first light portion L1b, and the first light portion L1c overlap one another on the plane A1 at the aperture position, or ideally fully overlap one another on the plane A1. In other words, the plane A1 has the highest proportion of overlap between the first light portions L1a to L1c with respect to the entire area of the first light L1.

As illustrated in FIG. 11, the first light portion L1a includes the main beam in the center of the first light L1 on the plane A1 and parallel to the optical axis AX1 adjacent to the first light source 2 and adjacent to the emission opening 4a. Similarly, the first light portion L1b includes the main beam parallel to the optical axis AX1 adjacent to the first light source 2 and adjacent to the emission opening 4a. The first light portion L1c includes the main beam parallel to the optical axis AX1 adjacent to the first light source 2 and adjacent to the emission opening 4a.

Although FIG. 11 schematically illustrates three first lenses 31, the number of first lenses 31 may be changed as appropriate. Although the first lenses 31 are biconvex lenses in the example in FIG. 11, any other lenses such as concave lenses may be used as appropriate.

In the illumination apparatus 1i, the main beams of the first light L1 emitted through the emission opening 4a are substantially parallel to one another without scattering. This reduces the divergence angle of the first light L1 emitted through the emission opening 4a. With such first light L1, the illumination apparatus 1B can illuminate a narrower illumination area and can be more inconspicuous.

Fourth Embodiment

Figure 12:
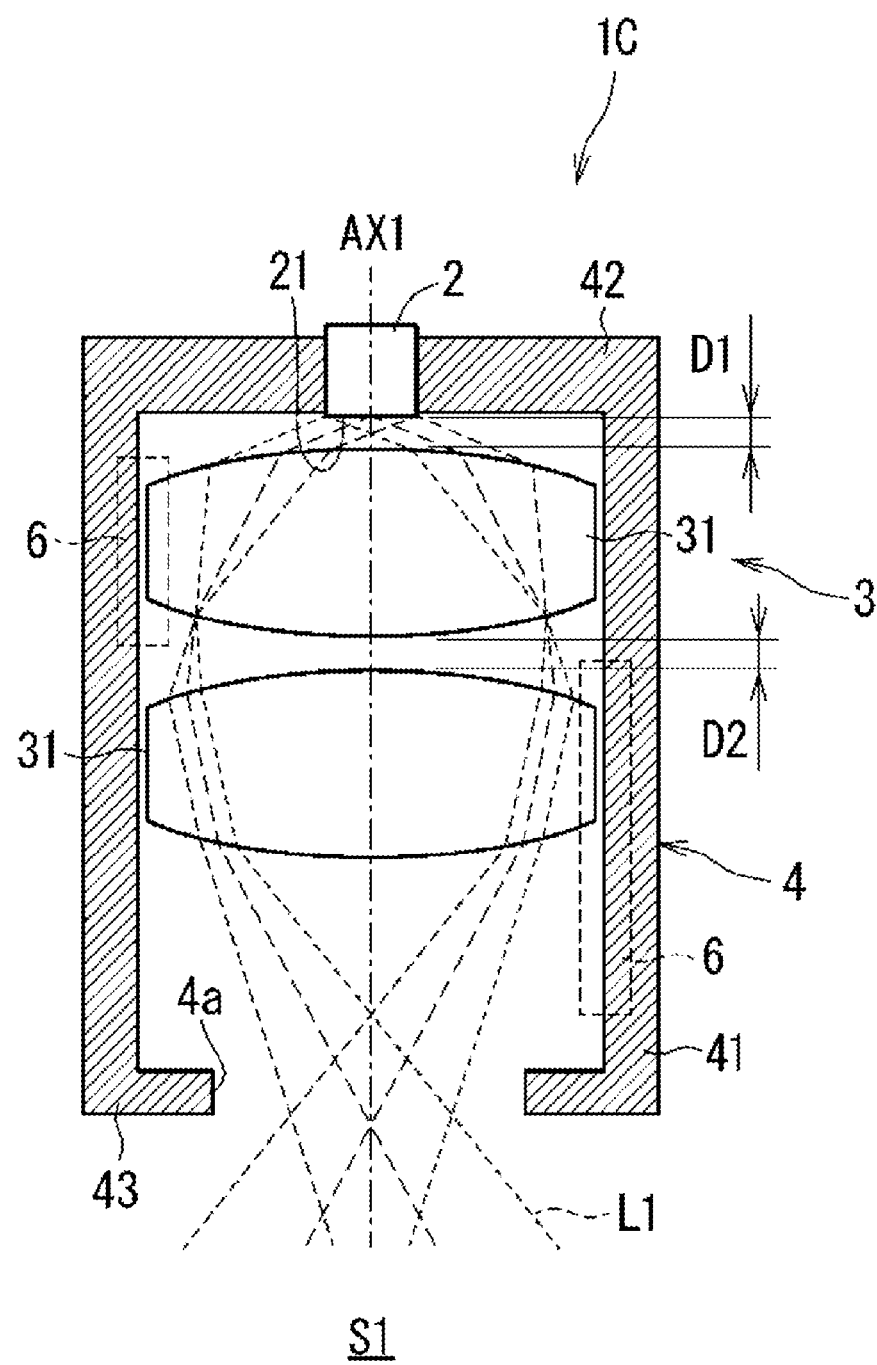
FIG. 12 is a schematic cross-sectional view of an illumination apparatus with an example structure according to a fourth embodiment.
Figure 13:
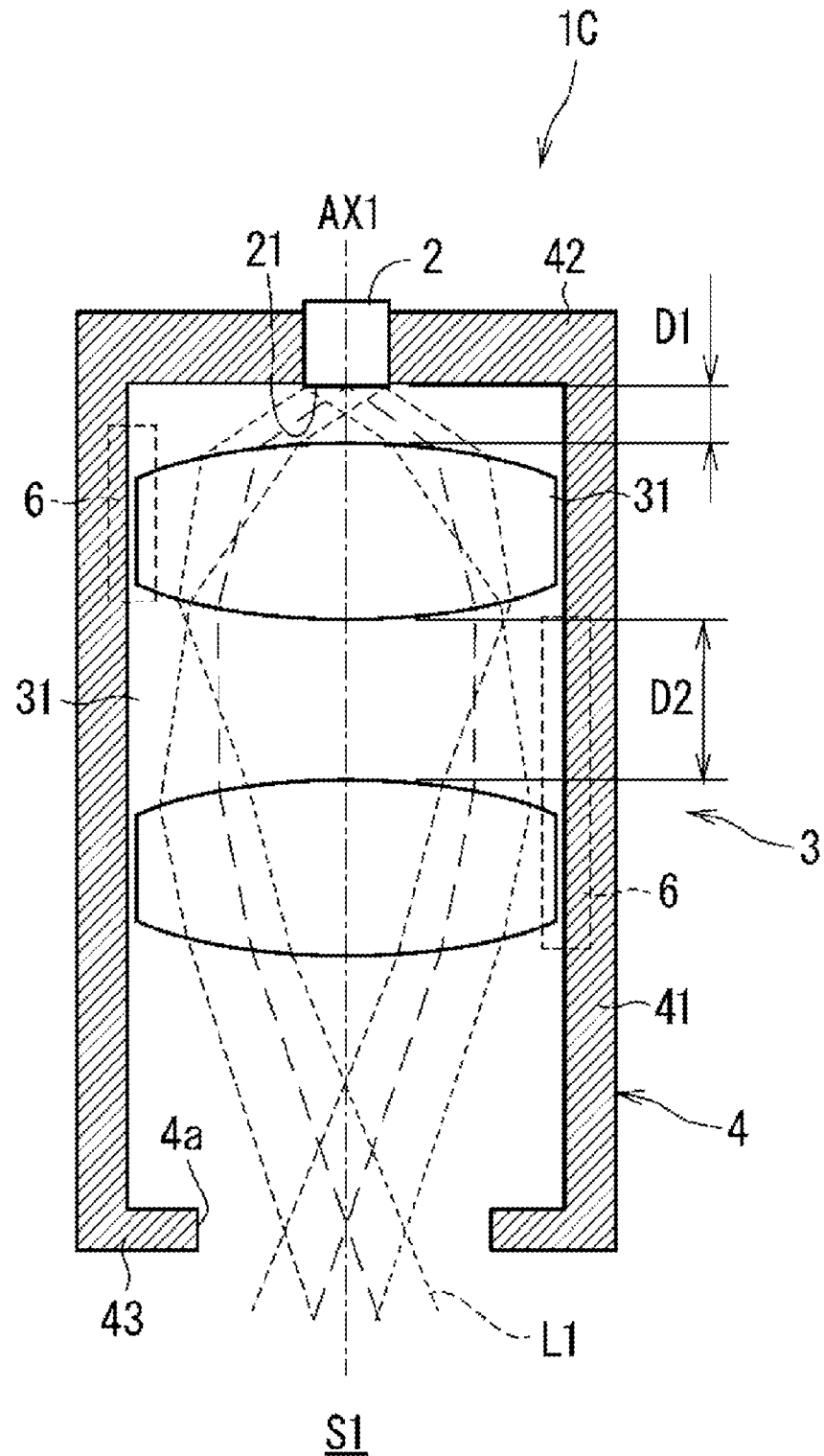
FIG. 13 is a schematic cross-sectional view of an illumination apparatus with an example structure according to the fourth embodiment.

FIGS. 12 and 13 are each a schematic cross-sectional view of an illumination apparatus 1C with an example structure according to a fourth embodiment. The illumination apparatus 1C differs from the illumination apparatus 1 in that the illumination apparatus 1C includes zoom assemblies 6.

Each zoom assembly 6 adjusts the position of the corresponding first lens 31 included in the first lens optical system 3 along the optical axis AX1 to adjust, through zooming, the divergence angle of the first light L1 emitted through the emission opening 4a. For example, the zoom assembly 6 may include, but is not limited to, a ball screw assembly. The ball screw assembly includes a lead screw extending in the optical axis direction, a carriage fastened to the lead screw by screwing, a lens holder connected to the carriage to hold the first lens 31, and a motor that rotates the lead screw. As the lead screw rotates, the carriage, the lens holder, and the first lens 31 move together in the optical axis direction. The motor is controlled by a controller (not illustrated).

The housing 4 may include multiple cylinders movable in the optical axis direction together with the first lenses 31. More specifically, each zoom assembly 6 may move the first lens 31 and the cylinder together. The housing 4 with this structure has the size in the optical axis direction changeable based on the positions of the first lenses 31.

A spacing D1 between the first emission portion 21 of the first light source 2 and the first lens 31 and a spacing D2 between the two adjacent first lenses 31 are larger in FIG. 13 than in FIG. 12. The illumination apparatus 1C in FIG. 13 can thus emit the first light L1 with a reduced divergence angle through the emission opening 4a.

As described above, the illumination apparatus 1C includes the zoom assemblies 6 that adjust the positions of the first lenses 31 to adjust the divergence angle of the first light L1 emitted through the emission opening 4a. This can adjust the illumination area.

The zoom assemblies 6 adjusting the positions of the first lenses 31 change the numerical aperture of the first lens optical system 3 and thus change the angle θ2 defining the numerical aperture. In this example, the divergence angle θ1 of the first light source 2 is set to a value less than or equal to the minimum value possible for the angle θ2 after the first lenses 31 are moved. The first light L1 from the first light source 2 can thus pass through the active area of the first lens optical system 3 after the first lenses 31 are moved by the zoom assemblies 6. In other words, the first light L1 from the first light source 2 is substantially not transmitted through the edges of the first lenses 31. The illumination apparatus 1C can thus emit the first light L1 with high efficiency and high quality into the illumination space S1 independently of the positions of the first lenses 31.

Fifth Embodiment

Figure 14:
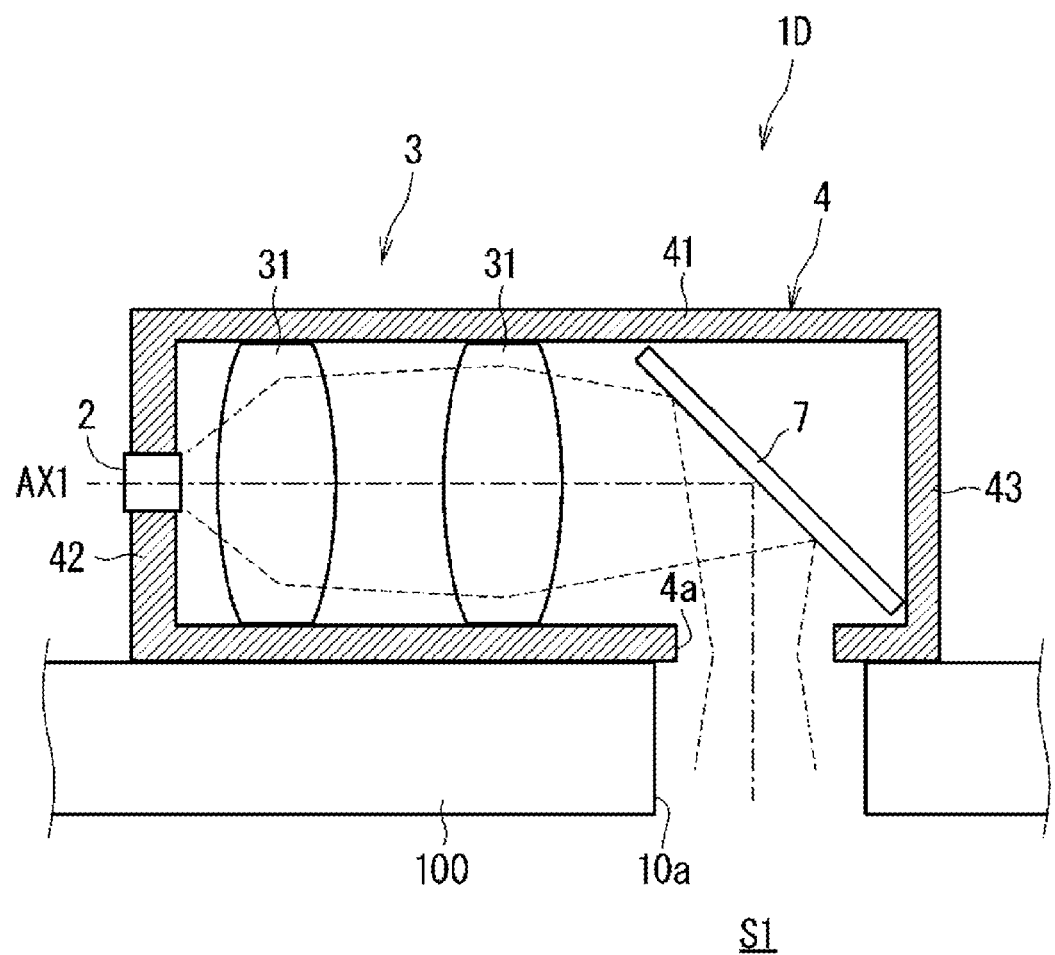
FIG. 14 is a schematic cross-sectional view of an illumination apparatus with an example structure according to a fifth embodiment.

FIG. 14 is a schematic cross-sectional view of an illumination apparatus 1D with an example structure according to a fifth embodiment. The illumination apparatus 1D differs from the illumination apparatus 1 in that the illumination apparatus 1D includes a reflector 7 and includes the emission opening 4a at a position different from the position of the illumination apparatus 1.

The reflector 7 is located inside the housing 4 to reflect the first light L1 to change its traveling direction. The reflector 7 includes, for example, a mirror or a prism. In the example in FIG. 14, the reflector 7 is located downstream from the first lens optical system 3 on the path of the first light L1. The reflector 7 reflects the first light L1 passing through the first lens optical system 3 toward the emission opening 4a.

In the example in FIG. 14, the emission opening 4a is located in the side wall 41, rather than in the second member 43 of the housing 4. The emission opening 4a extends through the side wall 41 in the thickness direction to connect the internal space of the housing 4 with the illumination space S1. In the example in FIG. 14, the emission opening 4a faces the reflector 7 in the radial direction about the central axis of the side wall 41. The first light L1 from the reflector 7 passes through the emission opening 4a and is emitted into the illumination space S1.

In the illumination apparatus 1D with this structure, the reflector 7 can redirect the first light L1 emitted from the first light source 2. This increases the flexibility in the position of the emission opening 4a.

In the example in FIG. 14, the reflector 7 reflects the first light L1 downward substantially at a right angle downstream from the first lens optical system 3. When the illumination apparatus 1D with this structure is installed on the ceiling in the illumination space S1, the illumination apparatus 1D can be located in a space above the ceiling and oriented to cause the first light source 2 to emit the first light L1 substantially parallel to the horizontal direction. FIG. 14 illustrates a ceiling board 100 defining the ceiling surface in the illumination space S1. The ceiling board 100 includes an opening 10a vertically extending through the ceiling board 100. The illumination apparatus 1D is located above the ceiling board 100 with the emission opening 4a facing the opening 10a.

The illumination apparatus 1D with this structure can be smaller in the vertical direction, although being larger in the horizontal direction with the multiple first lenses 31 in the first lens optical system 3 horizontally aligned. The illumination apparatus 1D can thus be installed in a space with a lower height above the ceiling. Thus, the illumination apparatus 1D can be effectively installed on the ceiling in the illumination space S1.

Figure 15:
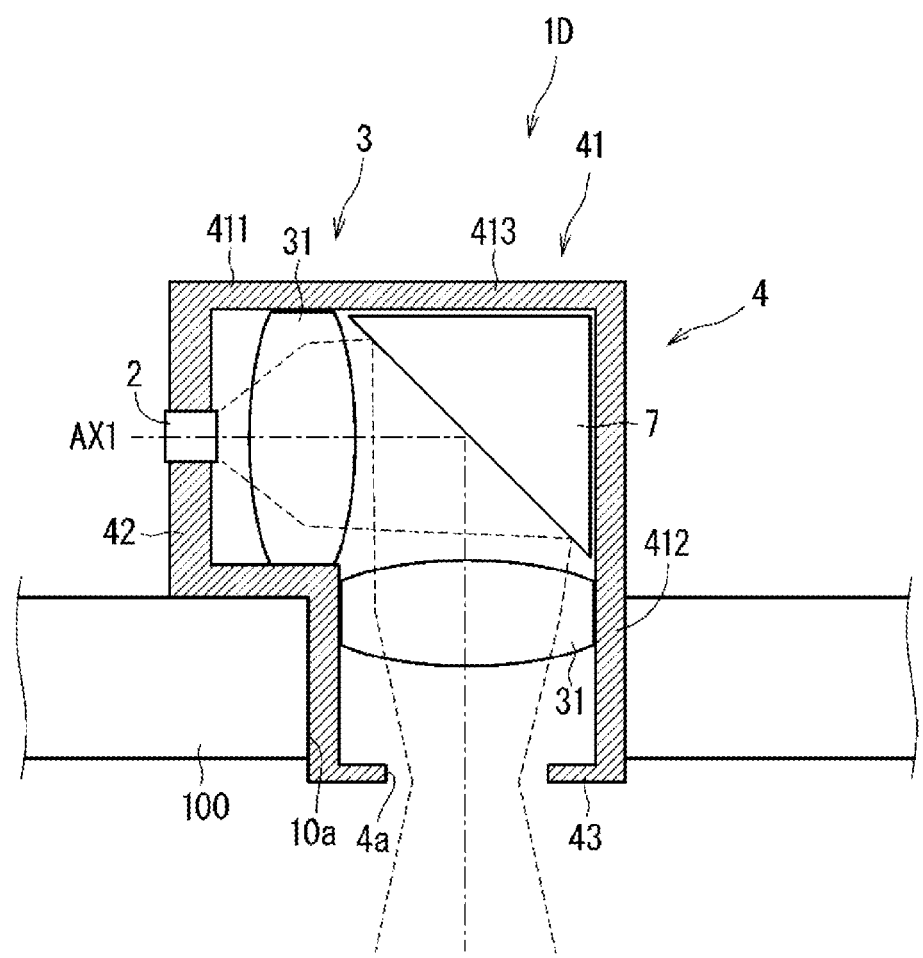
FIG. 15 is a schematic cross-sectional view of an illumination apparatus in another implementation of the fifth embodiment.

FIG. 15 is a schematic cross-sectional view of the illumination apparatus 1D in another implementation. In the example in FIG. 15, the reflector 7 is between two first lenses 31 on the path of the first light L1. The first lens 31 nearer the first light source 2 is hereafter referred to as a first-A lens 31. The first lens 31 nearer the emission opening 4a is referred to as a first-B lens 31.

In the example in FIG. 15, the side wall 41 of the housing 4 defines an L-shaped internal space. More specifically, the side wall 41 extends from the periphery of the first member 42 in the traveling direction of the first light L1, bends at a position corresponding to the reflector 7, and extends in the traveling direction of the first light L1 from the reflector 7 to the periphery of the second member 43. The side wall 41 is substantially in the shape of an L-pipe. The side wall 41 includes a portion (first portion 411) upstream from the reflector 7, a portion (second portion 412) downstream from the reflector 7, and a portion (connection portion 413) connecting the first portion 411 and the second portion 412.

The first-A lens 31 included in the first lens optical system 3 is between the first light source 2 and the reflector 7. The first-A lens 31 is located in the first portion 411. The first-B lens 31 included in the first lens optical system 3 is between the reflector 7 and the emission opening 4a in the second member 43. The first-B lens 31 is located in the second portion 412. The reflector 7 is located in the connection portion 413.

When the illumination apparatus 1D in this implementation is installed on the ceiling in the illumination space S1, the illumination apparatus 1D can be located in a space above the ceiling and oriented to cause the first light source 2 to emit the first light L1 substantially parallel to the horizontal direction. The illumination apparatus 1D can thus be installed in a space with a lower height above the ceiling. In the illumination apparatus 1D in this implementation, the second portion 412 can be received in the opening 10a in the ceiling board 100. The illumination apparatus 1D with this structure can be smaller in the space above the ceiling.

Sixth Embodiment

Figure 16:
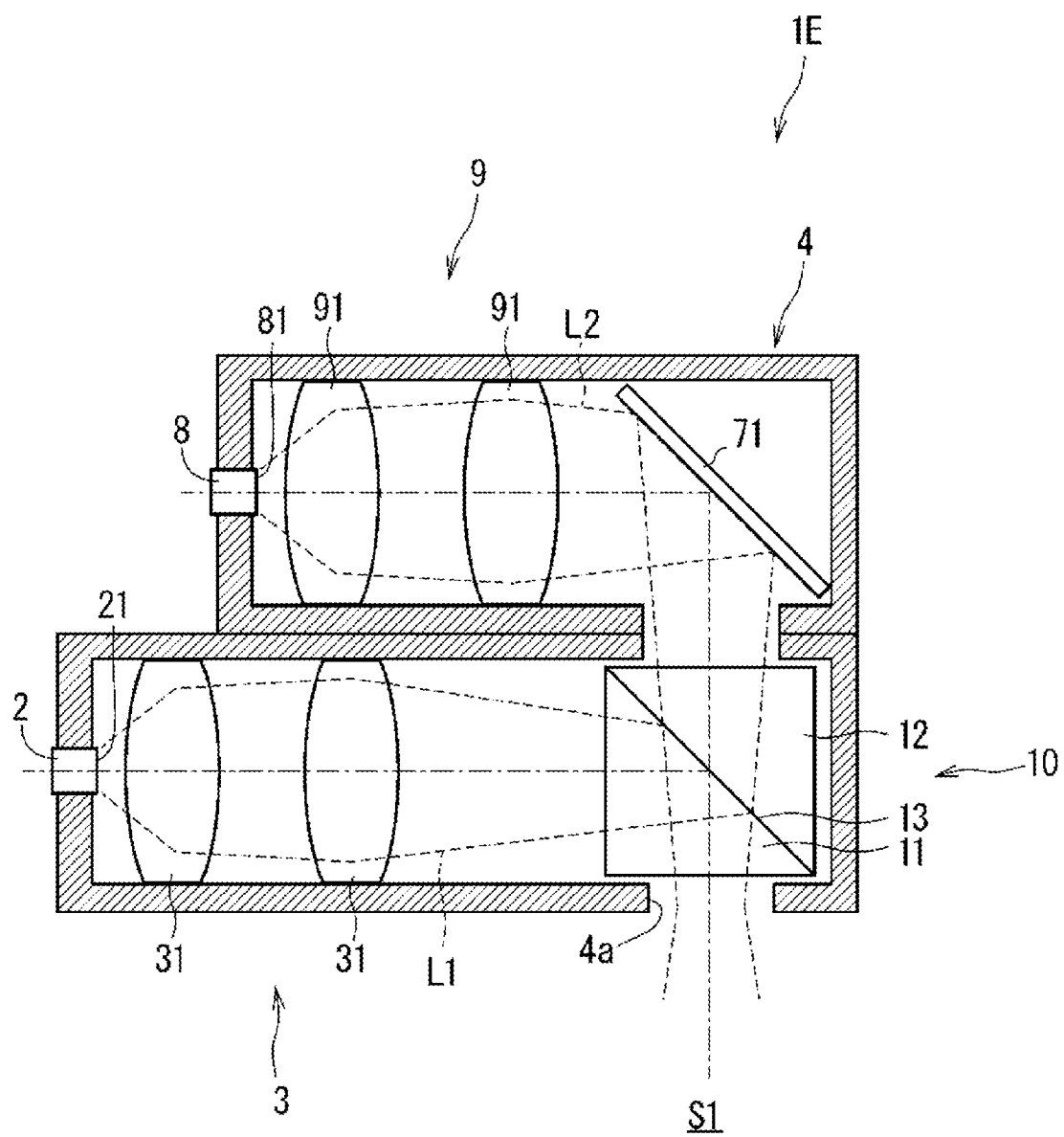
FIG. 16 is a schematic cross-sectional view of an illumination apparatus with a structure according to a sixth embodiment.

FIG. 16 is a schematic cross-sectional view of an illumination apparatus 1E with an example structure according to a sixth embodiment. The illumination apparatus 1E differs from the illumination apparatus 1 in that the illumination apparatus 1E includes a second light source 8, a second lens optical system 9, and a combiner 10. As illustrated in FIG. 16, the housing 4 accommodates at least the first lens optical system 3, the second lens optical system 9, and the combiner 10. The housing 4 thus has a shape different from the shape of the housing 4 in the illumination apparatus 1.

The second light source 8 includes a second emission portion 81 to emit second light L2 from the first light source 2. The second light L2 differs from the first light L1. The second light L2 differs from the first light L1 in the wavelength range and is, for example, visible light. In a specific example, the second light source 8 has a structure that is the same as or similar to the structure of the first light source 2.

In the example in FIG. 16, the second light source 8 is also fixed to the housing 4. The second light source 8 emits the second light L2 into the internal space of the housing 4. In the example in FIG. 16, the second light source 8 emits the second light L2 parallel to the traveling direction of the first light L1 from the first light source 2. The second light L2 from the second light source 8 diverges while traveling similarly to the first light L1.

The second lens optical system 9 is inside the housing 4. The second lens optical system 9 is an optical imaging system that forms an image of the second light L2 from the second light source 8 on an imaginary image plane located opposite to the second light source 8, or in other words, adjacent to the emission opening 4a. The image plane is located in, for example, the emission opening 4a, similarly to the image plane IS1. The second lens optical system 9 includes one or more second lenses 91. In the example in FIG. 16, multiple (two in this example) second lenses 91 are aligned with a spacing in between on the path of the second light L2. In a specific example, the second lenses 91 are the same as or similar to the first lenses 31.

In the example in FIG. 16, a set of the second light source 8 and the second lens optical system 9 is located parallel to a set of the first light source 2 and the first lens optical system 3. In the example in FIG. 16, the apparatus includes a reflector 71 located downstream from the second lens optical system 9. The reflector 71 reflects the second light L2 from the second lens optical system 9 toward the combiner 10. In the example in FIG. 16, the reflector 71 is located above the combiner 10 in the housing 4 and faces the combiner 10 in the vertical direction. The reflector 71 includes, for example, a mirror or a prism.

The combiner 10 combines the first light L1 and the second light L2. For example, the combiner 10 includes a first prism 11, a second prism 12, and a filter film 13. In the example in FIG. 16, the first prism 11 and the second prism 12 are each in the shape of an isosceles triangle with their oblique surfaces facing each other.

The filter film 13 is located on the oblique surfaces of the first prism 11 and the second prism 12 to reflect the first light L1 and transmit the second light L2. More specifically, the filter film 13 has a higher transmittance for the wavelength range of the second light L2 than for the wavelength range of the first light L1, and has a higher reflectance for the wavelength range of the first light L1 than for the wavelength range of the second light L2. The filter film 13 with such characteristics may include, for example, a dielectric multilayer film. The dielectric multilayer film includes, for example, multiple dielectric thin films stacked on one another. The dielectric is made of, for example, one or more of $TiO_2$, $SiO_2$, $Nb_2O_5$, $Ta_2O_5$, or $MgF_2$.

In the example in FIG. 16, the first light L1 is transmitted through the first prism 11 in the combiner 10 and is incident on the filter film 13 at an angle of 45 degrees. The first light L1 is reflected from the filter film 13. In the example in FIG. 16, the first light L1 travels downward in the vertical direction after being reflected. The second light L2 is transmitted through the second prism 12 and is incident on the filter film 13 at an angle of 45 degrees. The second light L2 is transmitted through the filter film 13 and combines with the first light L1 reflected from the filter film 13. In other words, the first light L1 and the second light L2 travel integrally downstream from the filter film 13.

The housing 4 includes the emission opening 4a at a position to allow passage of the first light L1 and the second light L2 from the combiner 10. In the example in FIG. 16, the emission opening 4a faces the combiner 10 in the vertical direction. The first light L1 and the second light L2 from the combiner 10 pass through the emission opening 4a in the housing 4 and are emitted into the illumination space S1.

In the illumination apparatus 1E, the second lens optical system 9 has an imaging magnification less than or equal to the ratio of the size of the emission opening 4a to the size of the second light L2 on the second emission portion 81 of the second light source 8. Thus, the second light L2 has a size smaller than or equal to the size of the emission opening 4a when passing through the emission opening 4a. The second light L2 is thus less likely to be reflected or scattered from the periphery of the emission opening 4a.

The imaging magnification of the second lens optical system 9 may be set to cause the second light L2 to have a smaller size than the emission opening 4a when passing through the emission opening 4a. This can further reduce reflection-scattering light.

In the illumination apparatus 1E, the divergence angle of the second light L2 on the second emission portion 81 is less than or equal to the angle defining the numerical aperture of the second lens optical system 9. This allows the second light L2 to pass through the active area of the second lens optical system 9. The second light L2 is thus substantially not incident on the edges of the second lenses 91, reducing or avoiding unintended scattering of the second light L2.

The illumination apparatus 1E can thus emit the second light L2 with high efficiency and high quality into the illumination space S1. The illumination apparatus 1E can also emit light with a wider wavelength range including the first light L1 and the second light L2 into the illumination space S1.

Figure 17:
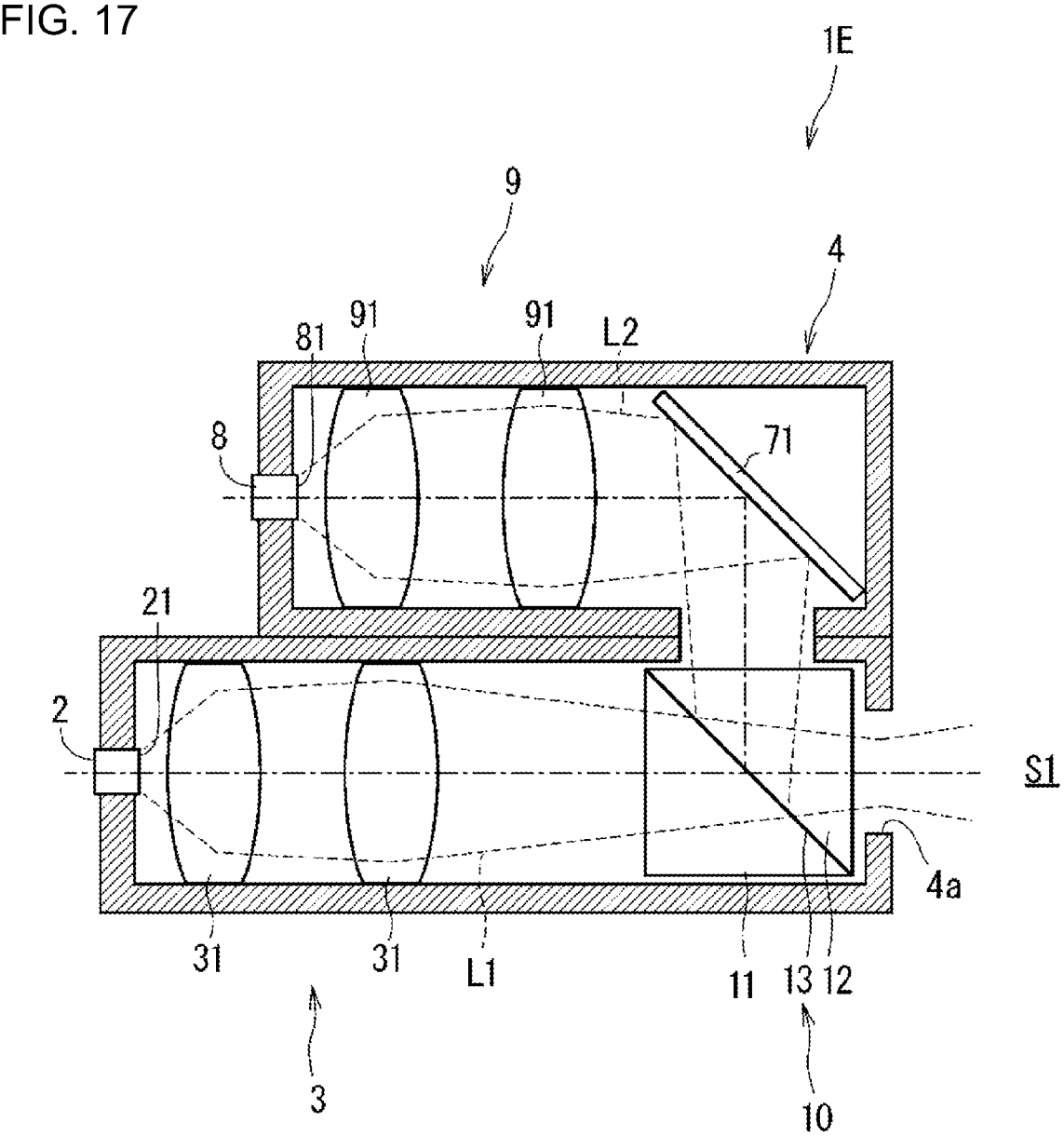
FIG. 17 is a schematic cross-sectional view of an illumination apparatus in a first implementation of the sixth embodiment.

FIG. 17 is a schematic cross-sectional view of the illumination apparatus 1E in a first implementation. In the example in FIG. 17, the filter film 13 in the combiner 10 transmits the first light L1 and reflects the second light L2. In the example in FIG. 17, the housing 4 includes the emission opening 4a facing the combiner 10 in the lateral direction.

Figure 18:
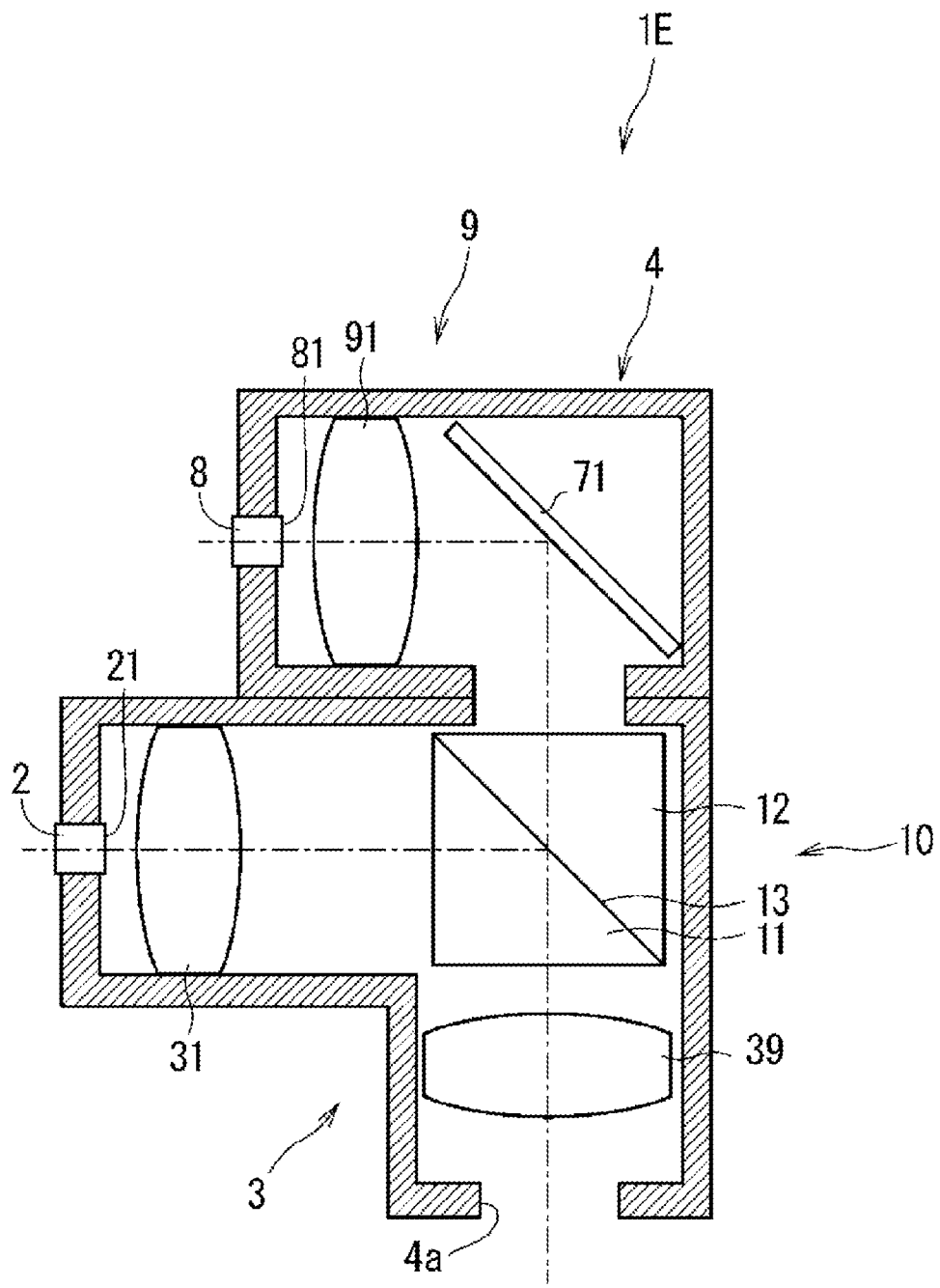
FIG. 18 is a schematic cross-sectional view of an illumination apparatus in a second implementation of the sixth embodiment.

FIG. 18 is a schematic diagram of the illumination apparatus 1E in a second implementation. In the example in FIG. 18, the apparatus includes a lens 39 between the combiner 10 and the emission opening 4a in the housing 4. The first light L1 and the second light L2 from the combiner 10 enter the lens 39. More specifically, in the example in FIG. 18, the first lens 31 and the lens 39 are included in the first lens optical system 3, and the second lens 91 and the lens 39 are included in the second lens optical system 9. The lens 39 thus serves as both the first lens 31 and the second lens 91.

The illumination apparatus 1E, in which the first lens optical system 3 and the second lens optical system 9 share the lens 39, can be smaller and manufactured at a lower cost.

Seventh Embodiment

Figure 19:
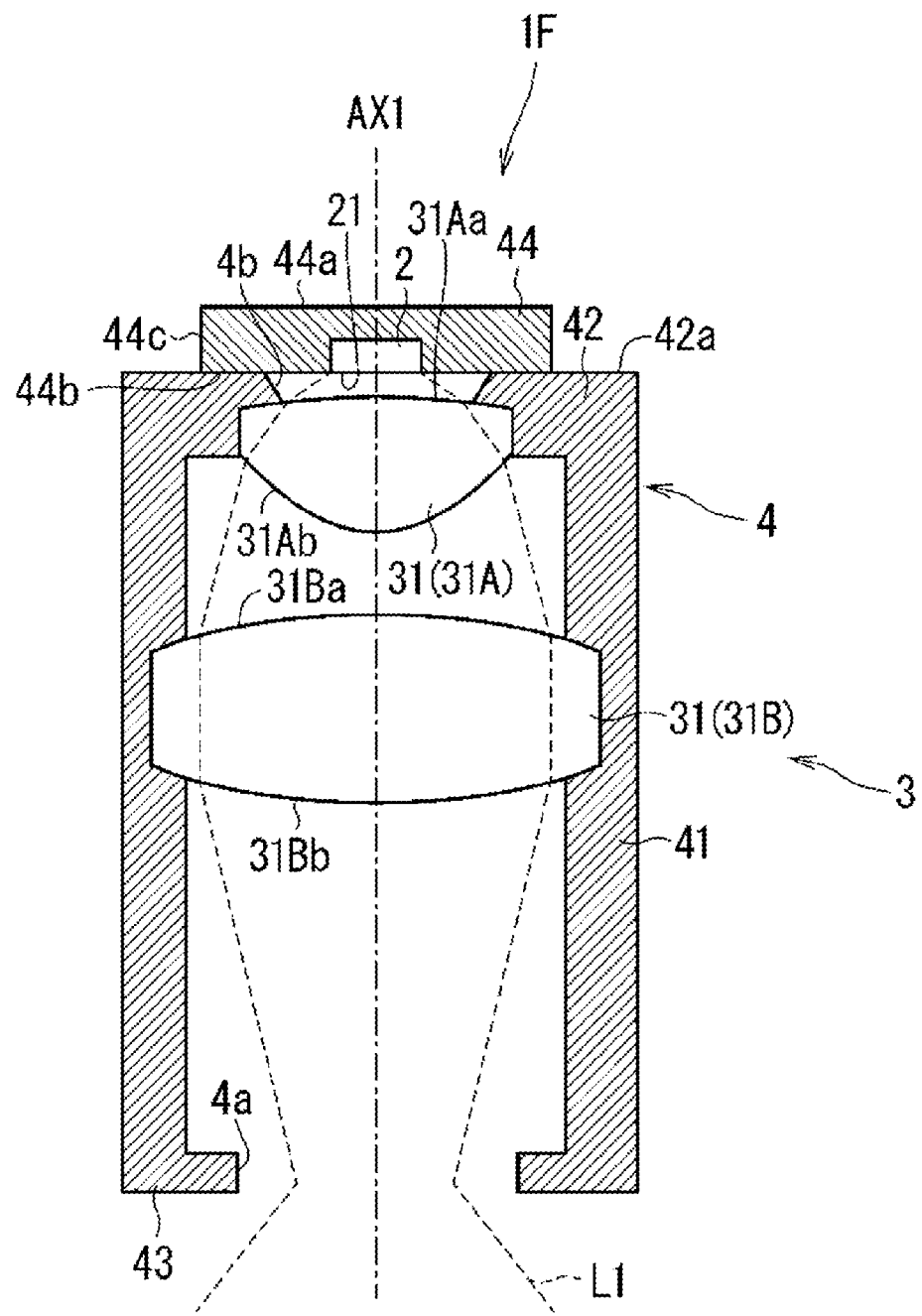
FIG. 19 is a schematic cross-sectional view of an illumination apparatus with an example structure according to a seventh embodiment.
Figure 20:
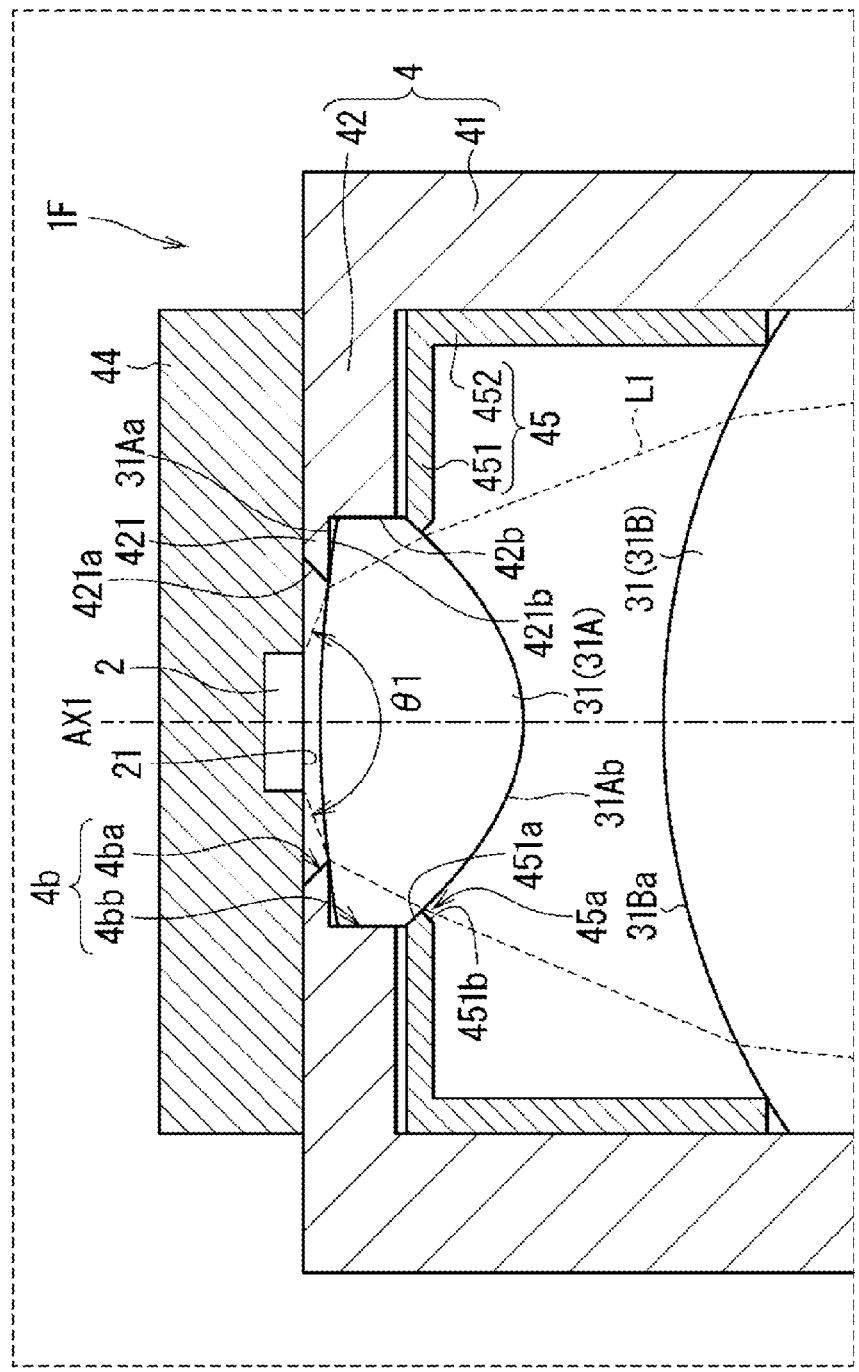
FIG. 20 is a partially enlarged cross-sectional view of the illumination apparatus in FIG. 19.

FIG. 19 is a schematic cross-sectional view of an illumination apparatus 1F with an example structure according to a seventh embodiment. FIG. 20 is a partially enlarged cross-sectional view of the illumination apparatus 1F. The illumination apparatus 1F differs from the illumination apparatus 1 in the specific structures of the housing 4 and the first lens optical system 3. An example of the first lens optical system 3 will be described first, and an example of the housing 4 will then be described.

In the example in FIG. 19, the first lens optical system 3 includes multiple first lenses 31. In a specific example, the first lens optical system 3 includes a first-A lens 31 and a first-B lens 31. The first-A lens 31 is hereafter also referred to as a first-A lens 31A. The first-B lens 31 is also referred to as a first-B lens 31B. The first-A lens 31A is nearer the first emission portion 21 of the first light source 2 than the first-B lens 31B. As illustrated in FIG. 19, the first-A lens 31A located immediately downstream from the first emission portion 21 may have a higher refractive power than the first-B lens 31B. This allows the first-A lens 31A to greatly reduce the degree of divergence of the first light L1 at a position nearest the first emission portion 21. In the example in FIG. 20, the first light L1 diverges immediately after passing through the first-A lens 31A toward the first-B lens 31B, but its divergence angle is much less than the divergence angle θ1 of the first light L1 entering the first-A lens 31A. Thus, the first-B lens 31B can be smaller in the width direction perpendicular to the optical axis AX1. In other words, the first light L1 from the first-A lens 31A can appropriately enter the smaller first-B lens 31B. The illumination apparatus 1F can thus be smaller in the width direction.

As illustrated in FIG. 19, the first-A lens 31A includes a first surface 31Aa and a second surface 31Ab. The first-B lens 31B includes a first surface 31Ba and a second surface 31Bb. In the first-A lens 31A, the first surface 31Aa is nearer the first emission portion 21, and the second surface 31Ab is nearer the emission opening 4a. In the first-B lens 31B, the first surface 31Ba is nearer the first emission portion 21, and the second surface 31Bb is nearer the emission opening 4a.

As illustrated in FIG. 19, the first-A lens 31A may include the first surface 31Aa convexly curved toward the first emission portion 21 and the second surface 31Ab convexly curved toward the emission opening 4a. The first surface 31Aa and the second surface 31Ab of the first-A lens 31A may be step-free curved surfaces. In other words, the first-A lens 31A may not be a Fresnel lens. The first-A lens 31A is thus less likely to scatter or reflect light, thus achieving a comfortable illumination space S1 with less glare. The first surface 31Aa of the first-A lens 31A may have a smaller curvature than the second surface 31Ab. In other words, the first surface 31Aa may be flatter than the second surface 31Ab. The first light L1 from the first emission portion 21 can enter a larger area of the flatter first surface 31Aa of the first-A lens 31A. In other words, the first light L1 from the first emission portion 21 can appropriately enter the first surface 31Aa of the first-A lens 31A.

Conversely, the second surface 31Ab of the first-A lens 31A may have a larger curvature than the first surface 31Aa. The first-A lens 31A including the second surface 31Ab with the larger curvature has a higher refractive power, thus greatly reducing the divergence angle of the first light L1. The illumination apparatus 1F can thus be smaller in the width direction.

As illustrated in FIG. 19, the first-B lens 31B may include the first surface 31Ba convexly curved toward the first emission portion 21 and the second surface 31Bb convexly curved toward the emission opening 4a. The first surface 31Ba and the second surface 31Bb of the first-B lens 31B may be step-free curved surfaces. In other words, the first-B lens 31B may not be a Fresnel lens. This achieves a comfortable illumination space S1 with less glare. As illustrated in FIG. 19, the first surface 31Aa of the first-A lens 31A may have a smaller curvature than each of the first surface 31Ba and the second surface 31Bb of the first-B lens 31B. The second surface 31Ab of the first-A lens 31A may have a larger curvature than each of the first surface 31Ba and the second surface 31Bb of the first-B lens 31B.

For a structure with three or more first lenses 31, the first lens 31 nearest the first emission portion 21 of the first light source 2 may have the highest refractive power. This allows the first lens 31 nearest the first emission portion 21 to greatly reduce the divergence angle of the first light L1. The illumination apparatus 1F can thus be smaller effectively in the width direction.

When the first-A lens 31A has a high refractive power, for example, the second surface 31Ab has a particularly large curvature as illustrated in FIG. 19. The first-A lens 31A including the second surface 31Ab with the large curvature cannot be easily manufactured to have a large size in the width direction. Such a first-A lens 31A can have a large size also along the optical axis AX1, thus increasing the size of the illumination apparatus 1F.

As illustrated in FIG. 19, the first-A lens 31A may be smaller than the first-B lens 31B. In other words, the first-A lens 31A may have a smaller area than the first-B lens 31B as viewed along the optical axis AX1. This facilitates the manufacture of the first-A lens 31A and also reduces the size of the illumination apparatus 1F in the optical axis direction.

As illustrated in FIG. 19, the housing 4 may further include a mount 44, in addition to the side wall 41, the first member 42, and the second member 43. The first member 42 may include a second opening (hereafter simply referred to as an opening) 4b. The opening 4b extends through the first member 42 in the optical axis direction. The first member 42 may be an opening member including the opening 4b. The opening 4b allows passage of the first light L1 from the first emission portion 21 of the first light source 2 as described later.

The mount 44 is fixed to the first member 42 to cover the opening 4b in the first member 42. The mount 44 is, for example, a plate with its thickness direction parallel to the optical axis direction. As illustrated in FIG. 19, the mount 44 may be fixed to a surface 42a of the first member 42 opposite to the emission opening 4a. The mount 44 may be fixed to the first member 42 with any method. In a specific example, the mount 44 may be fixed to the first member 42 with a fixing agent such as an adhesive. The mount 44, which covers the opening 4b, serves as a lid.

The mount 44 includes a surface 44a, a surface 44b, and a side surface 44c. The mount 44 includes the surface 44b adjacent to the first member 42. The surface 44b of the mount 44 includes an outer peripheral portion facing and in contact with the surface 42a of the first member 42 in the optical axis direction. The mount 44 includes the surface 44a opposite to the surface 44b. The side surface 44c connects the surface 44a and the surface 44b of the mount 44.

As illustrated in FIG. 19, the first light source 2 may be located on the surface 44b of the mount 44. The first light source 2 is located on a portion of the surface 44b of the mount 44 facing the opening 4b in the first member 42 in the optical axis direction. As illustrated in FIG. 19, the mount 44 may include a recess on the surface 44b to receive the first light source 2.

The first emission portion 21 of the first light source 2 may have an area smaller than the minimum value of the area of the opening 4b in the first member 42 as viewed in the optical axis direction. This allows the first light L1 traveling and diverging from the first emission portion 21 to pass through the opening 4b more appropriately.

As illustrated in FIGS. 19 and 20, the first-A lens 31A may be received in the opening 4b in the first member 42. More specifically, as illustrated in FIG. 20, the opening 4b in the first member 42 may include a noise reduction opening 4ba and a lens-receiving opening 4bb. The lens-receiving opening 4bb is a space accommodating the first-A lens 31A and is nearer the first-B lens 31B than the noise reduction opening 4ba. The noise reduction opening 4ba connects with the lens-receiving opening 4bb in the optical axis direction and has a smaller area than the lens-receiving opening 4bb.

In other words, the first member 42 includes the opening 4b defined by a stepped inner peripheral surface. More specifically, the inner peripheral surface of the first member 42 includes a first inner peripheral surface 421a defining the noise reduction opening 4ba, a second inner peripheral surface 42b defining the lens-receiving opening 4bb, and a connecting surface 421b connecting the first inner peripheral surface 421a and the second inner peripheral surface 42b. The first inner peripheral surface 421a is nearer the optical axis AX1 than the second inner peripheral surface 42b. Thus, the noise reduction opening 4ba has a smaller area than the lens-receiving opening 4bb.

The first member 42 includes an inner peripheral protrusion 421. The inner peripheral protrusion 421 extends to a position nearer the optical axis AX1 than the second inner peripheral surface 42b and surrounds the optical axis AX1. The inner peripheral protrusion 421 includes an inner peripheral surface corresponding to the first inner peripheral surface 421a, and includes a surface corresponding to the connecting surface 421b adjacent to the first-A lens 31A. The second inner peripheral surface 42b of the first member 42 may be in contact with the side surface of the first-A lens 31A. The side surface of the first-A lens 31A refers to the surface connecting the periphery of the first surface 31Aa and the periphery of the second surface 31Ab. The first-A lens 31A may be fitted in the lens-receiving opening 4bb in the first member 42.

The first light L1 from the first emission portion 21 of the first light source 2 passes through the noise reduction opening 4ba and enters the first lens optical system 3 (specifically, the first-A lens 31A). In other words, the opening 4b in the first member 42 (specifically, the noise reduction opening 4ba) allows passage of the first light L1 toward the first lens optical system 3. Conversely, the first member 42 blocks noise light (hereafter also referred to as non-passage light) with a low intensity outside the first light L1. In the example in FIG. 20, the first inner peripheral surface 421a of the noise reduction opening 4ba is inclined with respect to the optical axis AX1. More specifically, the first inner peripheral surface 421a is inclined to increase the area of the noise reduction opening 4ba at a smaller distance from the first emission portion 21. In other words, the first inner peripheral surface 421a of the noise reduction opening 4ba is inclined away from the central axis of the opening 4b (the optical axis AX1 in this example) at a smaller distance from the first emission portion 21. With the first emission portion 21 located near the noise reduction opening 4ba, most of the non-passage light from the first emission portion 21 is incident on the first inner peripheral surface 421a of the noise reduction opening 4ba. The non-passage light is, for example, reflected or scattered from the first inner peripheral surface 421a of the noise reduction opening 4ba and travels in a direction opposite to the first-A lens 31A, or is partially absorbed by the first member 42.

As described above, the first light L1 output from the first emission portion 21 passes through the noise reduction opening 4ba, and the non-passage light outside the first light L1 is blocked by the first member 42. This reduces unintended reflection-scattering light to be emitted through the emission opening 4a, thus achieving a comfortable illumination space S1 with less glare.

In the above example, the first-A lens 31A is received in the opening 4b in the first member 42 located immediately downstream from the first emission portion 21. More specifically, the first-A lens 31A is received in the lens-receiving opening 4bb located immediately downstream from the noise reduction opening 4ba. The first-A lens 31A is thus located at a small distance from the first emission portion 21. This allows a major portion of the first light L1 from the first emission portion 21 to enter the first-A lens 31A.

The structure for holding the first-A lens 31A will now be described. As illustrated in FIG. 20, the housing 4 may further include an inner housing 45. The inner housing 45 together with the first member 42 serves as a lens holder to hold the first-A lens 31A. The inner housing 45 is between the first-A lens 31A and the first-B lens 31B. The periphery of the first-A lens 31A is held between the inner peripheral protrusion 421 in the first member 42 and the inner housing 45 in the optical axis direction. More specifically, the inner peripheral protrusion 421 in the first member 42 is in contact with the periphery of the first surface 31Aa of the first-A lens 31A, and the inner housing 45 is in contact with the periphery of the second surface 31Ab of the first-A lens 31A.

As illustrated in FIG. 20, the inner housing 45 may include a holder member 451 and a side wall 452. The holder member 451 is nearer the first-B lens 31B than the first member 42. The holder member 451 is a plate with its thickness direction parallel to the optical axis direction. The holder member 451 faces the first member 42 in the optical axis direction. The holder member 451 includes an opening 45a in its center. The portion of the holder member 451 defining the periphery of the opening 45a is in contact with the second surface 31Ab of the first-A lens 31A.

In the example in FIG. 20, the first light L1 diverges while traveling through the first-A lens 31A. As illustrated in FIG. 20, the opening 45a in the holder member 451 may thus have a larger area than the noise reduction opening 4ba in the first member 42. This allows the first light L1 to pass through the opening 45a in the holder member 451 more effectively with the first-A lens 31A being held by the first member 42 and the holder member 451 appropriately.

As illustrated in FIG. 20, the opening 45a in the holder member 451 may be defined by an inner peripheral surface including a first slope 451a and a second slope 451b. The first slope 451a is in contact with and along the second surface 31Ab of the first-A lens 31A. Thus, the first slope 451a is inclined away from the optical axis AX1 at a smaller distance from the first emission portion 21 of the first light source 2 in the optical axis direction. The second slope 451b is nearer the first-B lens 31B than the first slope 451a and is connected to the first slope 451a. The second slope 451b is inclined in a direction opposite to the direction in which the first slope 451a is inclined. More specifically, the second slope 451b is inclined toward the optical axis AX1 at a smaller distance from the first slope 451a in the optical axis direction. In other words, the second slope 451b is inclined away from the optical axis AX1 at a smaller distance from the emission opening 4a.

The holder member 451 with this structure can be thicker and can also include a larger opening 45a. This allows the first light L1 to pass through the opening 45a at a higher intensity and also allows the holder member 451 to have a higher strength. In the above example, the first light L1 transmitted through the first-A lens 31A is less likely to be incident on the second slope 451b, which is inclined with respect to the optical axis AX1. This structure reduces unintended scattering or reflection of the first light L1, thus reducing unintended reflection-scattering light to be emitted through the emission opening 4a.

The side wall 452 of the inner housing 45 is cylindrical, surrounds the optical axis AX1, and extends from the outer peripheral edge of the holder member 451 toward the first-B lens 31B. The inner surface of the side wall 452 is nearer the optical axis AX1 than the side surface of the first-B lens 31B. The outer surface of the side wall 452 and the side surface of the first-B lens 31B may be in contact with the inner surface of the side wall 41. The edge of the side wall 452 of the inner housing 45 nearer the first-B lens 31B may be in contact with the periphery of the first surface 31Ba of the first-B lens 31B. The inner housing 45 with this structure can also serve as a spacer defining the spacing between the first-A lens 31A and the first-B lens 31B. In other words, the inner housing 45 can have the same or similar function as, for example, the spacer 32 in FIG. 6.

The properties of the mount 44 will now be described. The mount 44 may have a higher thermal conductivity than the other portion of the housing 4. The mount 44 may be made of, for example, a metal material with a high thermal conductivity. Examples of the metal material include copper (Cu), aluminum (Al), magnesium (Mg), gold (Au), silver (Ag), iron (Fe), chromium (Cr), cobalt (Co), beryllium (Be), molybdenum (Mo), tungsten (W), and an alloy of any of these metals. The other portion of the housing 4 (e.g., the first member 42) may be made of any of a variety of synthetic resins.

The mount 44 with a high thermal conductivity can cool the first light source 2. The mount 44 with a high thermal conductivity can serve as a heat sink. This reduces deterioration of the first light source 2 under heat. For the first light source 2 including the wavelength converter 23 (also refer to FIG. 1), for example, the wavelength converter 23 can deteriorate under heat. The mount 44 with a high thermal conductivity can reduce deterioration of the wavelength converter 23 under heat. For the first light source 2 including the wavelength converter 23, the mount 44 may have a higher thermal conductivity than the wavelength converter 23. The mount 44 may be joined to the wavelength converter 23. The mount 44 can thus cool the wavelength converter 23 more effectively.

The illumination apparatuses 1 and 1A to 1F described above in detail are illustrative in all respects, and are not limited to the above examples. Many variations not specifically described above may be implemented without departing from the scope of the disclosure. The components described in the above embodiments and variations may be combined or eliminated as appropriate unless any contradiction arises.

The components described in the above embodiments and variations may be entirely or partially combined as appropriate unless any contradiction arises.

The invention claimed is:

1. An illumination apparatus, comprising:
    a housing including an opening;
    a first light source including a first emission portion to emit first light into an internal space of the housing; and
    a first lens optical system including at least one first lens between the first emission portion and the opening in the housing on a path of the first light, the first lens optical system being configured to form an image of the first light from the first emission portion on an imaginary image plane adjacent to the opening and configured to cause the first light to be emitted through the opening,
    wherein an angle defining a numerical aperture of the first lens optical system is greater than a divergence angle of the first light from the first emission portion.

2. The illumination apparatus according to claim 1, wherein
    the first lens optical system has an imaging magnification less than or equal to a ratio of a size of the opening to a size of the first light on the first emission portion.

3. The illumination apparatus according to claim 1, wherein
    the first emission portion includes a wavelength converter, and
    the first light includes fluorescence emitted from the wavelength converter.

4. The illumination apparatus according to claim 1, wherein
    the at least one first lens includes a continuously curved surface.

5. The illumination apparatus according to claim 1, wherein
    the illumination apparatus emits light through the opening at an orientation angle of less than 60 degrees.

6. The illumination apparatus according to claim 1, wherein
    a distance between the first emission portion and the opening is larger than an inner diameter of the housing.

7. The illumination apparatus according to claim 1, wherein
    the at least one first lens includes a first-A lens and a first-B lens aligned in an optical axis direction of the first light.

8. The illumination apparatus according to claim 7, wherein the first light has a smaller diameter when passing between the first-A lens and the first-B lens than when passing through each of the first-A lens and the first-B lens.

9. The illumination apparatus according to claim 7, wherein
the first-A lens is nearer the first emission portion than the first-B lens, and
the first-A lens has a higher refractive power than the first-B lens.

10. The illumination apparatus according to claim 9, wherein
the first-B lens is larger than the first-A lens.

11. The illumination apparatus according to claim 1, wherein
the at least one first lens includes a first surface facing the first emission portion and a second surface facing the opening, and
the first surface has a smaller curvature than the second surface.

12. The illumination apparatus according to claim 1, wherein
the first light emitted through the opening has a divergence angle less than the divergence angle of the first light emitted from the first emission portion.

13. The illumination apparatus according to claim 1, wherein
the image plane is located in the opening.

14. The illumination apparatus according to claim 1, further comprising:
a light reducer configured to absorb reflection-scattering light entering the internal space of the housing, the reflection-scattering light being the first light reflected or scattered.

15. The illumination apparatus according to claim 1, further comprising:
a light reducer configured to reflect or scatter reflection-scattering light entering the internal space of the housing toward the first emission portion, the reflection-scattering light being the first light reflected or scattered.

16. The illumination apparatus according to claim 1, wherein
the first lens optical system includes a double telecentric optical system.

17. The illumination apparatus according to claim 1, further comprising:
a reflector in the housing, the reflector being configured to reflect the first light toward the opening.

18. The illumination apparatus according to claim 1, further comprising:
an opening member including a second opening to allow passage of the first light from the first emission portion toward the first lens optical system,
wherein the at least one first lens is located in the second opening.

19. The illumination apparatus according to claim 18, wherein
the opening member includes an inner peripheral surface defining the second opening, and the inner peripheral surface includes a portion inclined to increase an area of the second opening at a smaller distance from the first emission portion.

20. The illumination apparatus according to claim 18, wherein
the housing further includes an inner housing holding, together with the opening member, a periphery of the at least one first lens,
the at least one first lens includes a first surface facing the first emission portion and a second surface facing the opening,
the opening member is in contact with a periphery of the first surface of the at least one first lens,
the inner housing includes a holder member,
the holder member includes a first slope in contact with a periphery of the second surface of the at least one first lens and a second slope located nearer the opening than the first slope, and
the second slope is inclined away from an optical axis of the at least one first lens at a smaller distance from the opening.

21. The illumination apparatus according to claim 18, wherein
the housing includes a mount located on a surface of the opening member opposite to the opening, and the mount covers the second opening, and
the first emission portion is located in a portion of the mount facing the second opening.

22. The illumination apparatus according to claim 21, wherein the mount has a higher thermal conductivity than another portion of the housing.

* * * * *